US012744653B2

(12) United States Patent
Takeda et al.

(10) Patent No.: US 12,744,653 B2
(45) Date of Patent: Sep. 22, 2026

(54) TECHNIQUES FOR SERVING CELL ACTIVATION AND DEACTIVATION USING REFERENCE SIGNALS

(71) Applicant: QUALCOMM Incorporated, San Diego, CA (US)

(72) Inventors: Kazuki Takeda, Minato-ku (JP); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 18/296,507

(22) Filed: Apr. 6, 2023

(65) Prior Publication Data

US 2023/0246755 A1 Aug. 3, 2023

Related U.S. Application Data

(63) Continuation of application No. 17/469,347, filed on Sep. 8, 2021, now Pat. No. 11,777,678.

(Continued)

(51) Int. Cl.
*H04L 5/00* (2006.01)
*H04W 72/231* (2023.01)

(52) U.S. Cl.
CPC .......... *H04L 5/0098* (2013.01); *H04L 5/0048* (2013.01); *H04L 5/0053* (2013.01); *H04W 72/231* (2023.01)

(58) Field of Classification Search
CPC ... H04L 5/0098; H04L 5/0048; H04L 5/0053; H04W 72/23–232
See application file for complete search history.

(56) References Cited

U.S. PATENT DOCUMENTS

| | | | | |
|---|---|---|---|---|
| 11,456,830 | B2 * | 9/2022 | Lee | H04L 5/0085 |
| 2017/0034706 | A1 * | 2/2017 | Ericson | H04W 16/04 |

(Continued)

FOREIGN PATENT DOCUMENTS

| | | | |
|---|---|---|---|
| CN | 111148097 | A | 5/2020 |
| CN | 111183667 | A | 5/2020 |

(Continued)

OTHER PUBLICATIONS

International Search Report and Written Opinion—PCT/US2021/049593—ISA/EPO—Dec. 22, 2021 (208167WO).

(Continued)

*Primary Examiner* — Kevin C. Harper
(74) *Attorney, Agent, or Firm* — Holland & Hart LLP

(57) ABSTRACT

Methods, systems, and devices for wireless communications are described. A user equipment (UE) may be configured to receive, while the UE is in wireless communications with a first serving cell supported by a base station, an indication to activate or deactivate a second serving cell supported by the base station. The UE may receive a reference signal from the base station via the first serving cell, the reference signal received a duration of time after receipt of the indication, where the duration of time is an interruption period for the wireless communications with the first serving cell. The UE may then resume the wireless communications with the first serving cell based on the interruption period ending at receipt of the reference signal.

28 Claims, 19 Drawing Sheets

Related U.S. Application Data

(60) Provisional application No. 63/079,630, filed on Sep. 17, 2020.

(56) References Cited

U.S. PATENT DOCUMENTS

| | | | |
|---|---|---|---|
| 2018/0007731 A1 | 1/2018 | Park et al. | |
| 2018/0014268 A1* | 1/2018 | Kuppusamy | H04L 27/266 |
| 2019/0045566 A1* | 2/2019 | Wu | H04L 5/001 |
| 2019/0116585 A1* | 4/2019 | Chakraborty | H04L 5/0048 |
| 2020/0146095 A1* | 5/2020 | Hsieh | H04W 76/28 |
| 2020/0336227 A1* | 10/2020 | Takeda | H04L 5/0057 |
| 2021/0058212 A1* | 2/2021 | Si | H04L 5/0094 |
| 2021/0409975 A1 | 12/2021 | Hsieh et al. | |
| 2022/0085930 A1 | 3/2022 | Takeda | |
| 2022/0132474 A1* | 4/2022 | Sasaki | H04W 52/02 |
| 2022/0217800 A1* | 7/2022 | Zhang | H04L 5/0048 |
| 2022/0224486 A1* | 7/2022 | Luo | H04W 52/0229 |

FOREIGN PATENT DOCUMENTS

| | | | | |
|---|---|---|---|---|
| KR | 20170016163 A | 2/2017 | | |
| WO | 2020067811 A1 | 4/2020 | | |
| WO | WO-2021056334 A1 * | 4/2021 | H04L 5/0048 |

OTHER PUBLICATIONS

3GPP: "3rd Generation Partnership Project, Technical Specification Group Radio Access Network, NR, Medium Access Control (MAC) Protocol Specification (Release 16)", 3GPP Standard, Technical Specification, 3GPP TS 38.321, 3rd Generation Partnership Project, Mobile Competence Centre, 650, Route Des Lucioles, F-06921 Sophia-Antipolis Cedex, France, vol. RAN WG2, No. V16.1.0, Jul. 24, 2020, pp. 1-151, XP051925832.

* cited by examiner

200

SSB Periodicity 520

SSB 515-a

SSB 515-b

RS 550-a

SSB 515-c

SSB 515-d

SCell 1 (Active) 510-a 545-a

RS 550-b

A-CSI-RS 555

SSB 515-a

SSB 515-b

SSB 515-c

SSB 515-d

SCell 2 (Activated) 510-b 545-b

540

PCell 1 (Active) 505

Control Message 525

PDSCH 530

Feedback Message 535

PUSCH 560

Period of Cell Deactivation

Cell Interruption Period

Active Cell (Usable)

600

800

1000

1200

1400

TECHNIQUES FOR SERVING CELL ACTIVATION AND DEACTIVATION USING REFERENCE SIGNALS

CROSS REFERENCE

The present application for patent is a continuation of U.S. patent application Ser. No. 17/469,347 by TAKEDA et al., entitled "TECHNIQUES FOR SERVING CELL ACTIVATION AND DEACTIVATION USING REFERENCE SIGNALS," filed Sep. 8, 2021, which claims the benefit of U.S. Provisional Patent Application No. 63/079,630 by TAKEDA et al., entitled "TECHNIQUES FOR SERVING CELL ACTIVATION AND DEACTIVATION USING REFERENCE SIGNALS," filed Sep. 17, 2020, each of which is assigned to the assignee hereof and expressly incorporated by reference herein.

FIELD OF TECHNOLOGY

The following relates to wireless communications, including techniques for serving cell activation and deactivation using reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may communicate with a UE via one or more serving cells (e.g., a primary cell (PCell) and one or more secondary cells (SCell)). The base station may activate additional serving cells (e.g., SCells) at the UE to increase data throughput, to alleviate network congestion, or both. Conversely, the network may also deactivate serving cells which were previously activated. However, the process of activating/deactivating a serving cell may result in interruptions of wireless communications within other serving cells which are within the same frequency band as the serving cell which is being activated/deactivated (e.g., intra-band carrier aggregation).

SUMMARY

The described techniques relate to improved methods, systems, devices, and apparatuses that support techniques for serving cell activation and deactivation using reference signals. Generally, the described techniques are directed to the use of reference signals (e.g., temporary reference signals) on serving cells which are to remain active at a user equipment (UE) in order to decrease a duration of interruption on the serving cells which is attributable to activation and/or deactivation of other serving cells at the UE. In some aspects, a UE may perform wireless communications with a first serving cell supported by a base station, and may receive an indication that a second serving cell supported by the base station is to be activated or deactivated. In this example, the first serving cell may include an active primary cell (PCell) and/or an active secondary cell (SCell), while the second cell may include a secondary cell that is to be activated or deactivated. As a result of activation/deactivation of the second serving cell, the wireless communications with the first serving cell may be interrupted. In order to shorten the interruption period of the first serving cell, a temporary reference signal may be transmitted on the first serving cell. By receiving the temporary reference signal on the first serving cell, the interruption period of the first serving cell may be reduced, thereby enabling communications to be resumed on the first serving cell. In other examples, the first serving cell may be a primary secondary cell (PSCell) in a secondary cell group (SCG), while the second serving cell may be a secondary cell in the SCG. In yet another example, the first serving cell may be a master node (MN) in a dual connectivity (DC) scenario, while the second serving cell may be a secondary node (SN) in the DC scenario.

A method of wireless communication at a UE is described. The method may include receiving, while the UE is in wireless communications with a first serving cell supported by a base station, an indication to activate or deactivate a second serving cell supported by the base station, receiving a reference signal from the base station via the first serving cell, the reference signal received a duration of time after receipt of the indication, where the duration of time is an interruption period for the wireless communications with the first serving cell, and resuming the wireless communications with the first serving cell based on the interruption period ending at receipt of the reference signal.

An apparatus for wireless communication at a UE is described. The apparatus may include a processor, memory coupled with the processor, and instructions stored in the memory. The instructions may be executable by the processor to cause the apparatus to receive, while the UE is in wireless communications with a first serving cell supported by a base station, an indication to activate or deactivate a second serving cell supported by the base station, receive a reference signal from the base station via the first serving cell, the reference signal received a duration of time after receipt of the indication, where the duration of time is an interruption period for the wireless communications with the first serving cell, and resume the wireless communications with the first serving cell based on the interruption period ending at receipt of the reference signal.

Another apparatus for wireless communication at a UE is described. The apparatus may include means for receiving, while the UE is in wireless communications with a first serving cell supported by a base station, an indication to activate or deactivate a second serving cell supported by the base station, receiving a reference signal from the base station via the first serving cell, the reference signal received a duration of time after receipt of the indication, where the duration of time is an interruption period for the wireless communications with the first serving cell, and resuming the wireless communications with the first serving cell based on the interruption period ending at receipt of the reference signal.

A non-transitory computer-readable medium storing code for wireless communication at a UE is described. The code may include instructions executable by a processor to receive, while the UE is in wireless communications with a first serving cell supported by a base station, an indication to activate or deactivate a second serving cell supported by the base station, receive a reference signal from the base station via the first serving cell, the reference signal received a duration of time after receipt of the indication, where the duration of time is an interruption period for the wireless communications with the first serving cell, and resume the wireless communications with the first serving cell based on the interruption period ending at receipt of the reference signal.

Some examples of the method, apparatuses, and non-transitory computer-readable medium described herein may further include operations, features, means, or instructions for receiving, from the base station, a control message including an indication of a set of resources usable by the UE to receive the reference signal, where receiving the reference signal may be based on the control message.

Some examples of the method, apparatuses, and non-transitory computer-readable medium described herein may further include operations, features, means, or instructions for receiving, from the base station via the first serving cell, a downlink control message scheduling a downlink transmission from the base station to the UE, where receiving the indication to activate or deactivate the second serving cell may be based on the downlink control message.

Some examples of the method, apparatuses, and non-transitory computer-readable medium described herein may further include operations, features, means, or instructions for receiving, via the downlink control message, an indication that reference signals associated with the first serving cell may have been activated, where receiving the reference signal may be based on receiving the indication that the reference signals may have been activated.

Some examples of the method, apparatuses, and non-transitory computer-readable medium described herein may further include operations, features, means, or instructions for determining that reference signals associated with the first serving cell may have been activated based on receiving the indication to activate or deactivate the second serving cell, where receiving the reference signal may be based on determining that the reference signals may have been activated.

Some examples of the method, apparatuses, and non-transitory computer-readable medium described herein may further include operations, features, means, or instructions for determining, based on receiving the medium access control-control element (MAC-CE) message, an indication that reference signals associated with the first serving cell may have been activated, where receiving the reference signal may be based on determining that the reference signals may have been activated.

Some examples of the method, apparatuses, and non-transitory computer-readable medium described herein may further include operations, features, means, or instructions for transmitting a feedback message to the base station based on receiving the indication to activate or deactivate the second serving cell, where the interruption period begins based on transmitting the feedback message.

In some examples of the method, apparatuses, and non-transitory computer-readable medium described herein, the indication may include operations, features, means, or instructions for receiving an additional reference signal from the base station via the second serving cell based on receiving the indication to activate the second serving cell, and establishing wireless communications with the base station via the second serving cell based on receiving the additional reference signal.

In some examples of the method, apparatuses, and non-transitory computer-readable medium described herein, the reference signal, the additional reference signal, or both, include a temporary reference signal.

In some examples of the method, apparatuses, and non-transitory computer-readable medium described herein, the temporary reference signal may be a tracking reference signal or a non-zero power channel state information reference signal (CSI-RS) configured as the tracking reference signal.

In some examples of the method, apparatuses, and non-transitory computer-readable medium described herein, the reference signal received via the first serving cell and the additional reference signal received via the second serving cell may be received using a common set of time resources.

In some examples of the method, apparatuses, and non-transitory computer-readable medium described herein, the reference signal received via the first serving cell and the additional reference signal received via the second serving cell may be received using a common sub-carrier spacing (SCS).

Some examples of the method, apparatuses, and non-transitory computer-readable medium described herein may further include operations, features, means, or instructions for receiving, from the base station, an indication that reference signals associated with both the first serving cell and the second serving cell may have been activated, where receiving the reference signal via the first serving cell, receiving the additional reference signal via the second serving cell, or both, may be based on receiving the indication that the reference signals may have been activated.

In some examples of the method, apparatuses, and non-transitory computer-readable medium described herein, the indication may include operations, features, means, or instructions for transmitting, to the base station, a feedback message based on receiving the indication to deactivate the second serving cell, and determining that the second serving cell may have been deactivated based on transmitting the feedback message.

In some examples of the method, apparatuses, and non-transitory computer-readable medium described herein, the first serving cell includes a PCell, and the second serving cell includes an SCell.

Some examples of the method, apparatuses, and non-transitory computer-readable medium described herein both the first serving cell and the second serving cell each include SCells.

Some examples of the method, apparatuses, and non-transitory computer-readable medium described herein the first serving cell and the second serving cell may be in the same frequency band.

Some examples of the method, apparatuses, and non-transitory computer-readable medium described herein may further include operations, features, means, or instructions for determining, during the interruption period and based on receiving the reference signal, automatic gain control (AGC) associated with the first serving cell, tracking associated with the first serving cell, or both.

In some examples of the method, apparatuses, and non-transitory computer-readable medium described herein, the first serving cell may be associated with a first radio access technology, and the second serving cell may be associated with a second radio access technology different from the first radio access technology.

In some examples of the method, apparatuses, and non-transitory computer-readable medium described herein, each of the first radio access technology and the second radio access technology include one of a New Radio (NR) access technology, a Fifth Generation (5G) radio access technology, a Long-Term Evolution (LTE) radio access technology, or a Fourth Generation (4G) radio access technology.

In some examples of the method, apparatuses, and non-transitory computer-readable medium described herein, the first serving cell may be associated with a first frequency band of a first radio access technology, and the second serving cell may be associated with a second frequency band of the first radio access technology.

In some examples of the method, apparatuses, and non-transitory computer-readable medium described herein, the first serving cell may be a PSCell of a SCG, and the second serving cell may be an SCell of the SCG.

A method of wireless communication at a base station is described. The method may include transmitting, to a UE while the base station is in wireless communications with the UE via a first serving cell supported by the base station, an indication to activate or deactivate a second serving cell supported by the base station, transmitting a reference signal to the UE via the first serving cell, the reference signal transmitted a duration of time after transmission of the indication, where the duration of time is an interruption period for the wireless communications with the first serving cell, and resuming the wireless communications with the UE via the first serving cell based on the interruption period ending at receipt of the reference signal.

An apparatus for wireless communication at a base station is described. The apparatus may include a processor, memory coupled with the processor, and instructions stored in the memory. The instructions may be executable by the processor to cause the apparatus to transmit, to a UE while the base station is in wireless communications with the UE via a first serving cell supported by the base station, an indication to activate or deactivate a second serving cell supported by the base station, transmit a reference signal to the UE via the first serving cell, the reference signal transmitted a duration of time after transmission of the indication, where the duration of time is an interruption period for the wireless communications with the first serving cell, and resume the wireless communications with the UE via the first serving cell based on the interruption period ending at receipt of the reference signal.

Another apparatus for wireless communication at a base station is described. The apparatus may include means for transmitting, to a UE while the base station is in wireless communications with the UE via a first serving cell supported by the base station, an indication to activate or deactivate a second serving cell supported by the base station, transmitting a reference signal to the UE via the first serving cell, the reference signal transmitted a duration of time after transmission of the indication, where the duration of time is an interruption period for the wireless communications with the first serving cell, and resuming the wireless communications with the UE via the first serving cell based on the interruption period ending at receipt of the reference signal.

A non-transitory computer-readable medium storing code for wireless communication at a base station is described. The code may include instructions executable by a processor to transmit, to a UE while the base station is in wireless communications with the UE via a first serving cell supported by the base station, an indication to activate or deactivate a second serving cell supported by the base station, transmit a reference signal to the UE via the first serving cell, the reference signal transmitted a duration of time after transmission of the indication, where the duration of time is an interruption period for the wireless communications with the first serving cell, and resume the wireless communications with the UE via the first serving cell based on the interruption period ending at receipt of the reference signal.

Some examples of the method, apparatuses, and non-transitory computer-readable medium described herein may further include operations, features, means, or instructions for transmitting, to the UE, a control message including an indication of a set of resources usable by the UE to receive the reference signal, where transmitting the reference signal may be based on the control message.

Some examples of the method, apparatuses, and non-transitory computer-readable medium described herein may further include operations, features, means, or instructions for transmitting, to the UE via the first serving cell, a downlink control message scheduling a downlink transmission from the base station to the UE, where transmitting the indication to activate or deactivate the second serving cell may be based on the downlink control message.

Some examples of the method, apparatuses, and non-transitory computer-readable medium described herein may further include operations, features, means, or instructions for transmitting, via the downlink control message, an indication that reference signals associated with the first serving cell may have been activated, where transmitting the reference signal may be based on transmitting the indication that the reference signals may have been activated.

In some examples of the method, apparatuses, and non-transitory computer-readable medium described herein, the indication to activate or deactivate the second serving cell may be transmitted to the UE via a MAC-CE message.

Some examples of the method, apparatuses, and non-transitory computer-readable medium described herein may further include operations, features, means, or instructions for receiving, from the UE, a feedback message based on transmitting the indication to activate or deactivate the second serving cell, where the interruption period begins based on the feedback message.

In some examples of the method, apparatuses, and non-transitory computer-readable medium described herein, the indication may include operations, features, means, or instructions for transmitting an additional reference signal to the UE via the second serving cell based on transmitting the indication to activate the second serving cell, and establishing wireless communications with the UE via the second serving cell based on transmitting the additional reference signal.

In some examples of the method, apparatuses, and non-transitory computer-readable medium described herein, the reference signal, the additional reference signal, or both, include a temporary reference signal.

In some examples of the method, apparatuses, and non-transitory computer-readable medium described herein, the temporary reference signal may be a tracking reference signal or a non-zero power CSI-RS configured as the tracking reference signal.

In some examples of the method, apparatuses, and non-transitory computer-readable medium described herein, the reference signal transmitted via the first serving cell and the additional reference signal transmitted via the second serving cell may be transmitted using a common set of time resources.

In some examples of the method, apparatuses, and non-transitory computer-readable medium described herein, the reference signal transmitted via the first serving cell and the additional reference signal transmitted via the second serving cell may be transmitted using a common SCS.

Some examples of the method, apparatuses, and non-transitory computer-readable medium described herein may further include operations, features, means, or instructions for transmitting, to the UE, an indication that reference signals associated with both the first serving cell and the second serving cell may have been activated, where transmitting the reference signal via the first serving cell, transmitting the additional reference signal via the second serving cell, or both, may be based on transmitting the indication that the reference signals may have been activated.

In some examples of the method, apparatuses, and non-transitory computer-readable medium described herein, the indication may include operations, features, means, or instructions for receiving, from the UE, a feedback message based on transmitting the indication to deactivate the second serving cell, and determining that the second serving cell may have been deactivated based on receiving the feedback message.

In some examples of the method, apparatuses, and non-transitory computer-readable medium described herein, the first serving cell includes a PCell, and the second serving cell includes an SCell.

Some examples of the method, apparatuses, and non-transitory computer-readable medium described herein both the first serving cell and the second serving cell each include SCells.

Some examples of the method, apparatuses, and non-transitory computer-readable medium described herein the first serving cell and the second serving cell may be in the same frequency band.

In some examples of the method, apparatuses, and non-transitory computer-readable medium described herein, the reference signal includes an indication of AGC associated with the first serving cell, an indication of tracking associated with the first serving cell, or both.

In some examples of the method, apparatuses, and non-transitory computer-readable medium described herein, the first serving cell may be associated with a first radio access technology, and the second serving cell may be associated with a second radio access technology different from the first radio access technology.

In some examples of the method, apparatuses, and non-transitory computer-readable medium described herein, each of the first radio access technology and the second radio access technology include one of an NR access technology, a 5G radio access technology, an LTE radio access technology, or a 4G radio access technology.

In some examples of the method, apparatuses, and non-transitory computer-readable medium described herein, the first serving cell may be associated with a first frequency band of a first radio access technology, and the second serving cell may be associated with a second frequency band of the first radio access technology.

In some examples of the method, apparatuses, and non-transitory computer-readable medium described herein, the first serving cell may be a PSCell of an SCG, and the second serving cell may be an SCell of the SCG.

DETAILED DESCRIPTION

Figure 1:
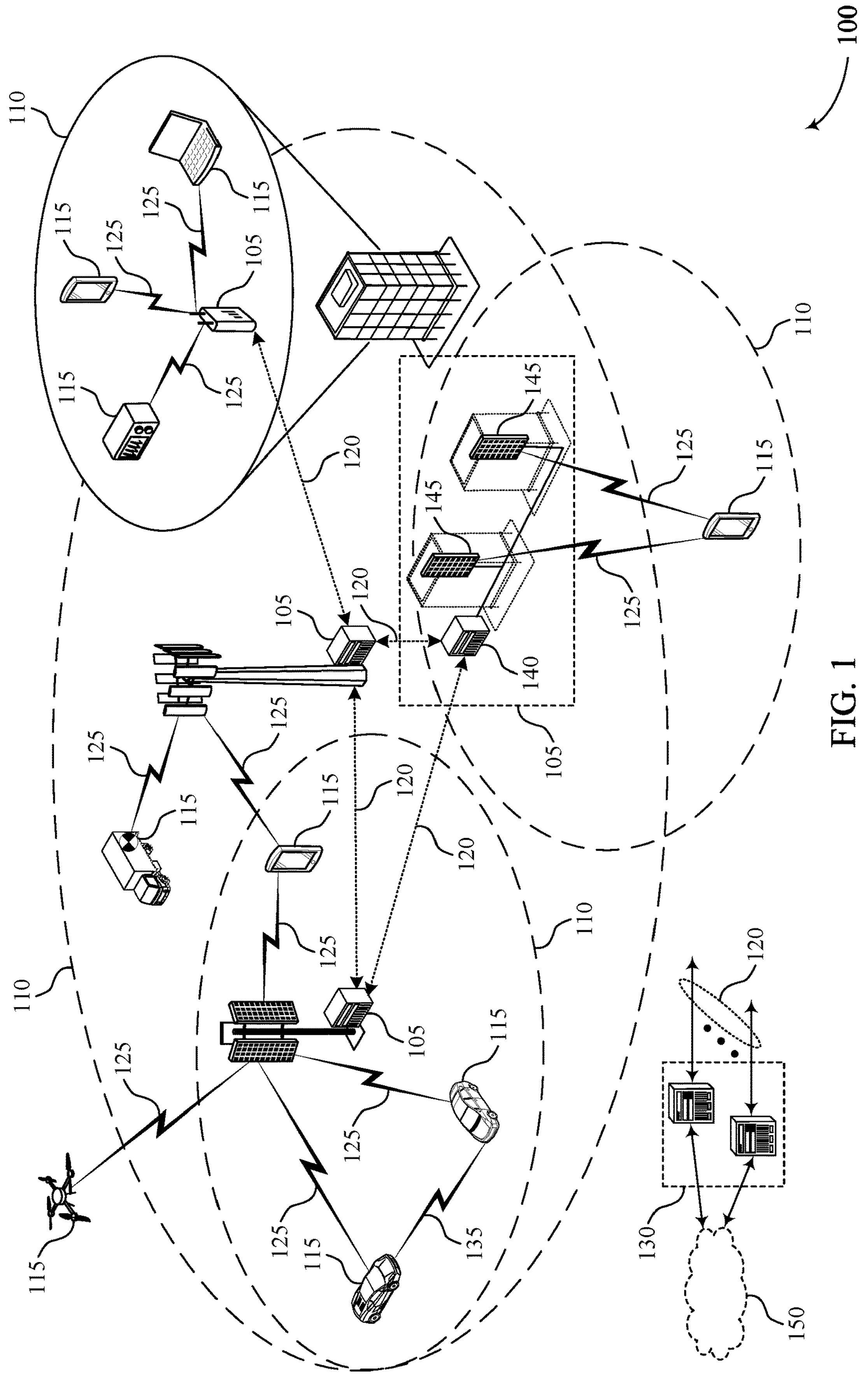
FIG. 1 illustrates an example of a wireless communications system that supports techniques for serving cell activation and deactivation using reference signals in accordance with aspects of the present disclosure.

In some wireless communications systems, the base station may communicate with a user equipment (UE) via one or more serving cells (e.g., a primary cell (PCell) and one or more secondary cells (SCells)). The network may activate additional serving cells (e.g., SCells) at the UE to increase data throughput, to alleviate network congestion, or both. Conversely, the network may also deactivate serving cells which were previously activated. However, the process of activating/deactivating a serving cell may result in interruptions of wireless communications within other serving cells which are within the same frequency band as the serving cell which is being activated/deactivated (e.g., intra-band carrier aggregation). For example, in cases where an SCell is within the same frequency band as a PCell, the process of activating and/or deactivating the SCell may include retuning of common antennas or antenna arrays, thereby resulting in an interruption of wireless communications on the PCell. In some cases, an interruption period of wireless communications at the PCell may extend from the time that the network informs the UE of the activation/deactivation of the SCell until receipt of a next synchronization signal block (SSB) on the PCell, which may result in significant interruptions in wireless communications.

To reduce interruptions of wireless communications on serving cells, techniques for serving cell activation and deactivation using reference signals are disclosed. Specifically, techniques described herein are directed to the use of temporary reference signals on serving cells which are already active and which are to remain active in order to reduce a duration of interruptions on the active serving cells which are attributable to activation/deactivation of other serving cells. For example, a UE may perform wireless communications with a first serving cell supported by a base station, and may receive an indication that a second serving cell supported by the base station is to be activated or deactivated. In the example, the first serving cell may include an active PCell and/or an active SCell, while the second serving cell may include an SCell that is to be activated or deactivated. As a result of activation or deactivation of the second serving cell, the wireless communications with the first serving cell may be interrupted. In some aspects, the UE may receive a temporary reference signal on the first serving cell in order to reduce a duration of the interruption on the first serving cell, and may resume wireless communications on the first serving cell based on receiving the temporary reference signal.

In cases where the second serving cell is being activated, the UE may additionally receive a second temporary reference signal on the second serving cell in order to shorten the activation time of the second serving cell. The temporary reference signals received via the first serving cell and the second serving cell may be received using a common set of time resources (e.g., same slot, same subframe), a common sub-carrier spacing (SCS), or any combination thereof. Moreover, the UE may be configured to determine that the temporary reference signals on the first serving cell and/or the second serving cell have been triggered (e.g., activated, initiated) based on explicit signaling from the base station (e.g., downlink control information (DCI) signaling, medium access control-control element (MAC-CE) signaling), implicitly based on the activation/deactivation of the second serving cell, or both. By reducing interruption periods on active serving cells which are attributable to activation/deactivation of additional serving cells, techniques described herein may enable more reliable, efficient wireless communications and improve overall user experience.

Aspects of the disclosure are initially described in the context of wireless communications systems. Additional aspects of the disclosure are described in the context of example resource allocation schemes and an example process flow. Aspects of the disclosure are further illustrated by and described with reference to apparatus diagrams, system diagrams, and flowcharts that relate to techniques for serving cell activation and deactivation using reference signals.

FIG. 1 illustrates an example of a wireless communications system 100 that supports techniques for serving cell activation and deactivation using reference signals in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for serving cell activation and deactivation using temporary reference signals. In particular, a UE 115 of the wireless communications system 100 may be configured to receive a reference signal (e.g., temporary reference signal) on a first serving cell supported by a base station 105 in order to reduce an interruption of wireless communications on the first serving cell which is attributable to the activation and/or deactivation of a second serving cell supported by the base station 105.

For example, a UE 115 of the wireless communications system 100 may perform wireless communications with a first serving cell (e.g., PCell) supported by a base station 105. In this example, the base station 105 may transmit, to the UE 115, an indication that a second serving cell (e.g., SCell) supported by the base station 105 is to be activated or deactivated at the UE 115. The base station 105 may activate the second serving cell at the UE 115 to increase data throughput, to alleviate network congestion, or both. Conversely, the base station 105 may deactivate the second serving cell when the benefits provided by the second serving cell (e.g., increased data throughput, alleviation of network congestion) are no longer needed. As a result of activation or deactivation of the second serving cell, the wireless communications with the first serving cell may be interrupted. In some aspects, the UE 115 may receive a temporary reference signal on the first serving cell in order to reduce a duration of the interruption on the first serving cell, and may resume wireless communications on the first serving cell based on receiving the temporary reference signal. For example, the UE 115 may determine automatic gain control (AGC) associated with the first serving cell, time/frequency tracking associated with the first serving cell, or both, based on the received temporary reference signal, thereby enabling the UE 115 to resume communications with the first serving cell.

In cases where the second serving cell is being activated, the UE 115 may additionally receive a second temporary reference signal on the second serving cell order to shorten the activation time of the second serving cell. The temporary reference signals received via the first serving cell and the second serving cell may be received using a common set of time resources (e.g., same slot, same subframe), a common SCS, or any combination thereof. Moreover, the UE 115 may be configured to determine that the temporary reference signals on the first serving cell and/or the second serving cell have been triggered (e.g., activated, initiated) based on explicit signaling from the base station 105 (e.g., DCI signaling, MAC-CE signaling), implicitly based on the activation/deactivation of the second serving cell, or both.

The techniques described herein may provide for improved wireless communications by reducing durations of interruption periods of active serving cells which are attributable to the activation/deactivation of other serving cells. In particular, by receiving reference signals (e.g., temporary reference signals, tracking reference signals, non-zero power CSI-RS with higher layer parameters such as trs-Info, and the like) on serving cells which are to remain active, a UE 115 may be able to determine information (e.g., AGC, time/frequency tracking) associated with the cells which are to remain active. This information determined based on the reference signals may thereby reduce a duration of interruptions, and enable the UE 115 to resume wireless communications on the active cells. By reducing durations of interruption periods of serving cells at the UE 115, techniques described herein may improve the efficiency and reliability of wireless communications, and improve overall user experience.

Figure 2:
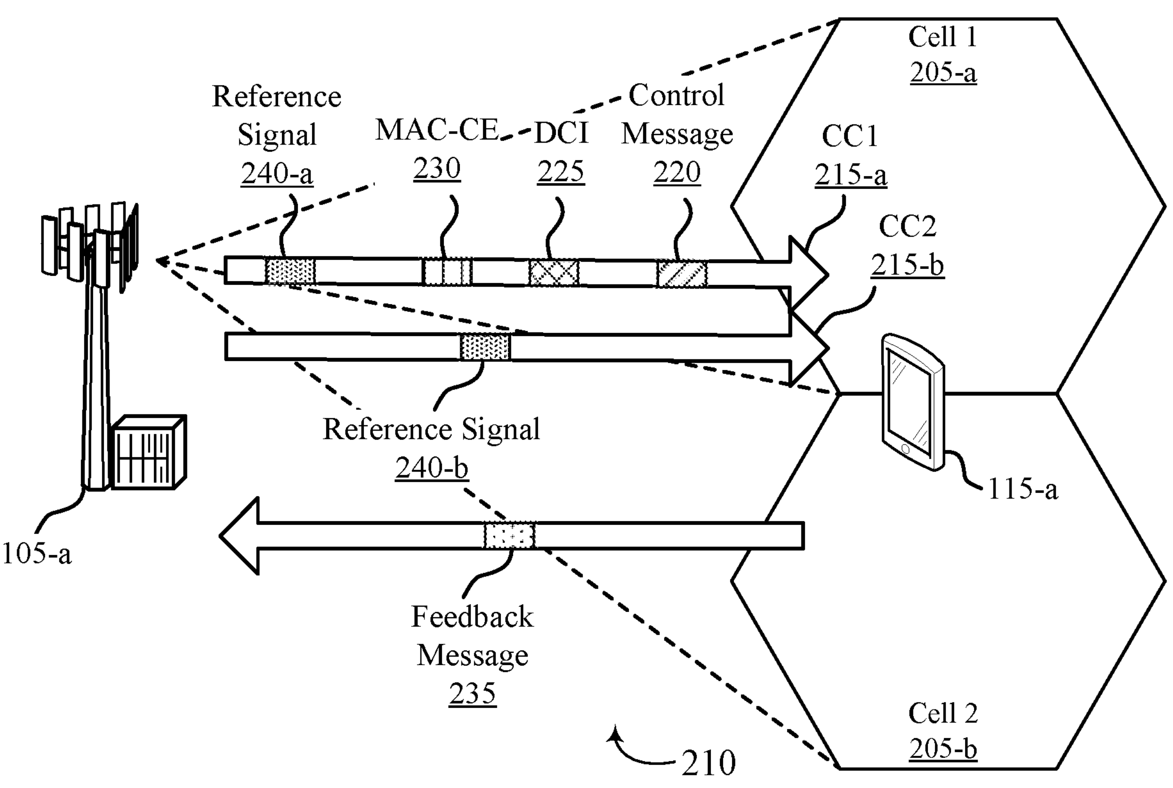
FIG. 2 illustrates an example of a wireless communications system that supports techniques for serving cell activation and deactivation using reference signals in accordance with aspects of the present disclosure.

FIG. 2 illustrates an example of a wireless communications system 200 that supports techniques for serving cell activation and deactivation using reference signals in accordance with aspects of the present disclosure. In some examples, wireless communications system 200 may implement aspects of wireless communications system 100. The wireless communications system 200 may include a UE 115-*a* and a base station 105-*a*, which may be examples of UEs 115 and base stations 105, as described with reference to FIG. 1.

The wireless communications system 200 may support wireless communications with wireless devices (e.g., UE 115-*a*) via one or more serving cells 205 of the wireless communications system 200. In particular, each serving cell 205 may be supported by one or more base stations 105 of the wireless communications system 200. For example, as shown in FIG. 2, the wireless communications system 200 may include a first serving cell 205-*a* supported by the base station 105-*a*, and a second serving cell 205-*b* supported by the base station 105-*a*. The serving cells 205 may include PCells, SCells, primary-secondary cells (PSCells) of a secondary cell group (SCG), or any combination thereof. The wireless communications system 200 may include any quantity of serving cells 205 supported by any quantity of base stations 105. For example, in additional or alternative cases, the first cell 205-*a* may be supported by the base station 105-*a*, and the second cell 205-*b* may be supported by a second base station 105 (not shown) which is different from the base station 105-*a*.

In some aspects, the first serving cell 205-*a* and the second serving cell 205-*b* may be associated with the same frequency band (e.g., intra-band carrier aggregation). In some aspects, the first serving cell 205-*a*, the second serving cell 205-*b*, or both, may include a PCell, an SCell, a PSCell of an SCG, or any combination thereof. For example, in cases where the first serving cell 205-*a* includes a PCell, the second serving cell 205-*b* may include an SCell. By way of another example, in cases where the first serving cell 205-*a* includes an SCell, the second serving cell 205-*b* may include an additional SCell. Moreover, in cases where the first serving cell 205-*a* includes a PSCell of an SCG, the second serving cell 205-*b* may include an SCell of an SCG.

In some cases, the first serving cell 205-*a*, the second serving cell 205-*b*, or both, may be associated with a given radio access technology, such as a 5G radio access technology, an NR access technology, a 4G radio access technology, an LTE radio access technology, or any combination thereof. In some cases, techniques described herein may be implemented in the context of dual connectivity scenarios. In this regard, the second serving cell 205-*b* may be associated with the same or different radio access technology as the radio access technology associated with the first serving cell 205-*a*. For example, in cases where the first serving cell 205-*a* is associated with a 5G or NR access technology, the second serving cell 205-*b* may be associated with a 4G radio access technology, an LTE radio access technology, or both. Moreover, in some cases, the first serving cell 205-*a* and the second serving cell 205-*b* may be associated with different frequency bands associated with a common radio access technology. For example, in some cases, both the first and second serving cells 205-*a* and 205-*b* may be associated with an NR access technology, where the first serving cell 205-*a* is associated an FR1 frequency band of the NR access technology and the second serving cell 205-*b* is associated an FR2 frequency band of the NR access technology. In some examples, the first serving cell 205-*a* and the second serving cell 205-*b* may be served by different base stations. For example, the first serving cell 205-*a* may be supported by a first base station (e.g., the base station 105-*a*) and the second serving cell may be supported by a second base station (e.g., another base station 105, not shown).

In some aspects, the UE 115-*a* may communicate with the base station 105-*a* using one or more beams, one or more carriers, one or more communications links, or any combination thereof. For example, each serving cell 205 may be associated with a different frequency range, separate beams, separate component carriers, and/or communications links to facilitate wireless communications between the UE 115-*a* and the respective serving cells 205. For example, the UE 115-*a* may communicate with the base station 105-*a* via a communication link 210, where the communication link 210 includes a first component carrier 215-*a* and a second component carrier 215-*b*. In some aspects, the first component carrier 215-*a* may be associated with the first serving cell 205-*a*, and the second component carrier 215-*b* may be associated with the second serving cell 205-*b*. In some cases, the communication link 210 may include an example of an access link (e.g., a Uu link). The communication link 210 may include a bi-directional link that can include both uplink and downlink communication. For example, the UE 115-*a* may transmit uplink transmissions, such as uplink control signals or uplink data signals, to the base station 105-*a* using the communication link 210, and the base station 105-*a* may transmit downlink transmissions, such as downlink control signals or downlink data signals, to the UE 115-*a* using the communication link 210.

In some aspects, the UE 115-*a* and the base station 105-*a* of the wireless communications system 200 may support techniques for serving cell activation and deactivation using temporary reference signals. In particular, the UE 115-*a* of the wireless communications system 200 may be configured to receive a reference signal (e.g., temporary reference signal) on the first serving cell 205-*a* supported by the base station 105-*a* in order to reduce an interruption of wireless communications on the first serving cell 205-*a* which is attributable to the activation and/or deactivation of the second serving cell 205-*b* supported by the base station 105-*a*.

For example, the UE 115-*a* may establish wireless communications with the first serving cell 205-*a*. In some aspects, the UE 115-*a* may establish the wireless communications with the first serving cell 205-*a* by initiating or otherwise performing a setup procedure with the first serving cell 205-*a*. In some aspects, the UE 115-*a* may receive a control message 220 from the base station 105-*a* via the first serving cell 205-*a*, the second serving cell 205-*b*, or both. For example, as shown in FIG. 2, the UE 115-*a* may receive the control message 220 via the first serving cell 205-*a* (e.g., via the first component carrier 215-*a*). In some aspects, the control message 220 may include an indication of a set of resources which are usable by the UE 115-*a* to receive reference signals 240 (e.g., temporary reference signals) from the base station 105-*a* via the first serving cell 205-*a*, the second serving cell 205-*b*, or both. The set of resources may include a set of time resources, a set of frequency resources, a set of spatial resources, or any combination thereof. The control message 220 may include an RRC message, a system information block (SIB) message, an SSB message, or any combination thereof. In some aspects, the UE 115-*a* may receive the control message 220 based on establishing the wireless communications with the first serving cell 205-*a*.

In some aspects, the UE 115-*a* may receive, from the base station 105-*a* via the first serving cell 205-*a* and/or the second serving cell 205-*b*, a DCI message 225 scheduling a downlink transmission (e.g., physical downlink shared channel (PDSCH) transmission, MAC-CE message 230) from the base station 105-*a* to the UE 115-*a*. For example, as shown in FIG. 2, the UE 115-*a* may receive the DCI message 225 from the base station 105-*a* via the first serving cell 205-*a* (e.g., via the first component carrier 215-*a*). The DCI message 225 may be transmitted via physical downlink control channel (PDCCH) resources. In some aspects, the UE 115-*a* may receive the DCI message 225 based on establishing the wireless communications with the first serving cell 205-*a*, receiving the control message 220 (e.g., RRC message, SIB message, SSB message), or any combination thereof. In some aspects, the DCI message 225 may include an indication that the reference signals 240 (e.g., temporary reference signals) associated with the first serving cell 205-*a*, the second serving cell 205-*b*, or both, have been activated (e.g., triggered, initiated). In this regard, the UE 115-*a* may be configured to determine that the UE 115-*a* may monitor for the reference signals 240 on the first serving cell 205-*a*, the second serving cell 205-*b*, or both, based on the indication in the DCI message 225.

In some aspects, the UE 115-*a* may receive, from the base station 105-*a* via the first serving cell 205-*a* and/or the second serving cell 205-*b*, an indication to activate or deactivate the second serving cell 205-*b*. For example, as shown in FIG. 2, the UE 115-*b* may receive a MAC-CE message 230 from the base station 105-*a* via the first serving cell 205-*a* (e.g., via the first component carrier 215-*a*). In this example, the MAC-CE message 230 may include an indication to activate or deactivate the second serving cell 205-*b*. some aspects, the base station 105-*a* may transmit, and the UE 115-*a* may receive, the indication to activate or deactivate the second serving cell 205-*a* (e.g., the MAC-CE message 230) based on the DCI message 225. For example, the DCI message 225 may schedule a PDSCH transmission (e.g., MAC-CE message 230), where the PDSCH transmission includes the indication to activate or deactivate the second serving cell 205-*b*.

In cases where the indication to activate or deactivate the second serving cell 205-*b* is conveyed via the MAC-CE message 230, the MAC-CE message 230 may include an indication that the reference signals 240 (e.g., temporary reference signals) associated with the first serving cell 205-*a*, the second serving cell 205-*b*, or both, have been activated (e.g., triggered, initiated). In this regard, the DCI message 225, the MAC-CE message 230, or both, may include an indication that the reference signals 240 associated with the first serving cell 205-*a* and/or second serving cell 205-*b* have been activated. In cases where reference signals 240 associated with both the first serving cell 205-*a* and the second serving cell 205-*b* are being triggered/activated (e.g., in cases where the second serving cell 205-*b* is being activated), the reference signals 240 associated with the respective serving cells 205 may be activated separately or together (e.g., in tandem). For example, the DCI message 225 and/or the MAC-CE message 230 may activate (e.g., indicate, trigger, request) temporary reference signals 240 on both the first and second serving cells 205. By way of another example, the DCI message 225 may activate (e.g., indicate, trigger, request) temporary reference signals 240-*a* on the first serving cell 205-*a*, and the MAC-CE message 230 may activate (e.g., indicate, trigger, request) temporary reference signals 240-*b* on the second serving cell 205-*b* (or vice versa).

In some aspects, the UE 115-*a* may transmit a feedback message 235 to the base station 105 via the first serving cell 205-*a*, the second serving cell 205-*b*, or both. For example, in cases where the MAC-CE message 230 is received via the first serving cell 205-*a*, the UE 115-*a* may transmit the feedback message 235 via the first serving cell 205-*a*. In some aspects, the UE 115-*a* may transmit the feedback message 235 to the base station 105-*a* based on (e.g., in response to) receiving the indication to activate or deactivate the second serving cell 205-*a*. The feedback message 235 may include an acknowledgement (ACK) message, a negative acknowledgement (NACK) message, or both. For example, in cases where the indication within the MAC-CE message 230 includes an activation of the second serving cell 205-*b*, the UE 115-*a* may transmit an ACK message in response to the activation of the second serving cell 205-*b*. By way of another example, in cases where the indication within the MAC-CE message 230 includes a deactivation of the second serving cell 205-*b*, the UE 115-*a* may transmit an ACK message in response to the deactivation of the second serving cell 205-*b*. In this example, the UE 115-*a* and/or the base station 105-*a* may determine that the second serving cell 205-*b* has been deactivated based on transmitting/receiving the feedback message 235.

In some cases, the UE 115-*a*, the base station 105-*a* associated with the serving cells 205, or both, may identify an interruption period of the wireless communications between the UE 115-*a* and the first serving cell 205-*a*. However, it is noted herein that the UE 115-*a*, the base station 105-*a*, or both, need not actually identify the interruption period in all circumstances. In some aspects, the UE 115-*a* and/or the base station 105-*a* may identify the interruption period based on receiving/transmitting the indication to activate or deactivate the second serving cell 205-*b* (e.g., based on the MAC-CE message 230). Additionally or alternatively, the UE 115-*a* and/or the base station 105-*a* may identify the interruption period based on transmitting/receiving the feedback message 235. For example, in some cases, the interruption period of the wireless communications between the UE 115-*a* and the first serving cell 205-*a* may begin based on the UE 115-*a* transmitting the feedback message 235. For instance, as discussed previously herein, the interruption period may begin after a certain duration of time (e.g., 3 ms) after the transmission of the feedback message 235. In this regard, transmission of the feedback message 235 may initiate or trigger the start of the interruption period.

In some aspects, the UE 115-*a* may determine that the reference signals 240 (e.g., temporary reference signals) associated with the first serving cell 205-*a*, the second serving cell 205-*b*, or both, have been activated (e.g., triggered, initiated). In some aspects, the reference signals 240 associated with the first serving cell 205-*a* and the second serving cell 205-*b* may be activated separately (e.g., at separate times, via separate signaling) or in tandem (e.g., at the same time, via the same signaling). In some aspects, the UE 115-*a* may determine that the reference signals 240 associated with the first serving cell 205-*a* and/or the second serving cell 205-*b* have been activated based on an implicit determination, based on explicit signaling received from the base station 105-*a*, or both. In particular, the UE 115-*a* may be configured to determine that the reference signals 240 associated with the first serving cell 205-*a* and/or the second serving cell 205-*b* have been activated based on receiving the DCI message 225, receiving the indication to activate/deactivate the second serving cell 205-*b* (e.g., MAC-CE message 230), or both.

For example, in cases where the DCI message 225 and/or the MAC-CE message 230 include an indication that the reference signals 240 associated with the first serving cell 205-*a* and/or the second serving cell 205-*b* have been activated, the UE 115-*a* may determine that the reference signals 240 have been activated based on the explicit signaling in the DCI message 225 and/or MAC-CE message 230. Conversely, the UE 115-*a* may be configured to determine that the reference signals 240 associated with the first serving cell 205-*a* and/or the second serving cell 205-*b* have been activated implicitly (e.g., without explicit signaling from the base station 105-*a*). For example, in some cases, the UE 115-*a* may be configured to determine that the reference signals 240 associated with the first serving cell 205-*a* and/or the second serving cell 205-*b* have been activated based on the indication to activate/deactivate the second serving cell 205-*b*. In this regard, the UE 115-*a* may be configured to determine that reference signals 240 associated with active serving cells 205 (e.g., first serving cell 205-*a*) which are to remain active have been triggered/activated by virtue of the second serving cell 205-*b* being activated or deactivated.

In some aspects, the UE 115-*a* may receive a reference signal 240-*a* from the base station 105-*a* via the first serving cell 205-*a*. In some aspects, the UE 115-*a* may receive the reference signal 240-*a* a duration of time after receipt of the indication to activate/deactivate the second serving cell 205-*b* and during the interruption period of wireless communications with the first serving cell 205-*a*. The reference signal 240-*a* may include, but is not limited to, a temporary reference signal 240-*a*. For example, the temporary reference signal may include a tracking reference signal, a non-zero power CSI-RS configured as a tracking reference signal, or both. In some aspects, the UE 115-*a* may receive the reference signal 240-*a* based on receiving the control message 220, receiving the DCI message 225, receiving the indication to activate/deactivate the second serving cell 205-*d* (e.g., receiving the MAC-CE message 230), transmitting the feedback message 235, identifying the interruption period, determining that the reference signals 240 associated with the first and/or second serving cells 205 have been activated, or any combination thereof. For example, in cases where the control message 220 includes an indication of the set of resources usable by the UE 115-*a* for receiving reference signals 240, the UE 115-*a* may receive the reference signals 240 based on (e.g., using, according to) the set of resources indicated in the control message 220.

In some aspects, the UE 115-*a* may determine and/or adjust AGC associated with the first serving cell 205-*a*, tracking (e.g., time tracking, frequency tracking) associated with the first serving cell 205-*a*, or any combination thereof. In some aspects, the UE 115-*a* may determine and/or adjust the AGC and/or tracking during the interruption period of wireless communications between the UE 115-*a* and the first serving cell 205-*a*. In some aspects, the UE 115-*a* may determine and/or adjust the AGC and/or tracking associated with the first serving cell 205-*a* based on the reference signal 240-*a* (e.g., temporary reference signal 240-*a*). For example, the reference signals 240-*a* received via the first serving cell 205-*a* may include non-zero power CSI-RS configured with trs-Info which enabled adjustment of AGC and/or tracking associated with the first serving cell 205-*a*.

In some aspects, the UE 115-*a* may resume the wireless communications with the first serving cell 205-*a*. In some cases, the reference signal 240-*a* may trigger an end to the interruption period, and the UE 115-*a* may resume the wireless communications with the first serving cell 205-*a* based on the interruption period ending. For example, UE 115-*a* may determine AGC and/or time/frequency tracking associated with the first serving cell 205-*a* based on the reference signal 240-*a* (e.g., temporary reference signal 240-*a*). In this example, the AGC and/or tracking may enable the UE 115-*a* to resume wireless communications with the first serving cell 205-*a*, and thereby trigger an end to the interruption period.

In cases where the indication to activate/deactivate the second serving cell 205-*a* includes an activation of the second serving cell 205-*b*, the UE 115-*b* may additionally receive an additional reference signal 240-*b* from the base station 105-*a* via the second serving cell 205-*b*. The additional reference signal 240-*b* may include, but is not limited to, a temporary reference signal 240-*b*. In some aspects, the UE 115-*a* may receive the additional reference signal 240-*b* based on receiving the control message 220, receiving the DCI message 225, receiving the indication to activate the second serving cell 205-*b* (e.g., MAC-CE message 230), transmitting the feedback message 235, determining that the reference signals 240-*b* associated with the second serving cell 205-*b* have been activated, or any combination thereof. For example, in cases where the control message 220 includes an indication of the set of resources usable by the UE 115-*b* for receiving reference signals 240, the UE 115-*a* may receive the additional reference signal 240-*b* based on (e.g., using, according to) the set of resources indicated in the control message 220.

In some cases, the reference signal received 240-*a* via the first serving cell 205-*a* and the additional reference signal 240-*b* received via the second serving cell 205-*b* may be received using a common set of time resources. For example, the base station 105-*a* may transmit, and the UE 115-*a* may receive, both the first reference signal 240-*a* and the additional reference signal 240-*b* within the same slot, the same subframe, or both. Additionally or alternatively, the reference signals 240 received via the first and second serving cells 205-*a* and 205-*b*, respectively, may be received/transmitted using the same characteristics or parameters including, but not limited to, sub-carrier spacing (SCS). For example, in some cases, the reference signal 240-*a* received via the first serving cell 205-*a* and the additional reference signal 240-*b* received via the second serving cell 205-*b* may be transmitted by the base station 105-*a* (and received by the UE 115-*a*) using a common SCS. In other cases, the reference signal 240-*a* received via the first serving cell 205-*a* and the additional reference signal

240-*b* received via the second serving cell 205-*b* may be transmitted by the base station 105-*a* (and received by the UE 115-*a*) using different SCSs.

In some aspects, the UE 115-*a* may determine and/or adjust AGC associated with the second serving cell 205-*b*, tracking (e.g., time tracking, frequency tracking) associated with the second serving cell 205-*b*, or any combination thereof. In some aspects, the UE 115-*b* may adjust the AGC and/or tracking associated with the second serving cell 205-*b* based on the additional reference signal 240-*b* (e.g., additional temporary reference signal 240-*b*). For example, the additional reference signal 240-*b* may include non-zero power CSI-RS resources configured with trs-Info which enables adjustment of AGC and/or tracking associated with the second serving cell 205-*b*.

In some aspects, the UE 115-*a*, the base station 105-*a*, or both, may determine that the second serving cell 205-*b* has been activated (e.g., indicated, triggered, requested), establish wireless communications with the second serving cell 205-*b*, or both. In some aspects, the UE 115-*a* and/or the base station 105-*a* may determine that the second serving cell 205-*b* has been activated (e.g., indicated, triggered, requested) and/or establish wireless communications with the second serving cell 205-*b* based on receiving the additional reference signal 240-*b*, determining and/or adjusting the AGC and/or tracking associated with the second serving cell 205-*b*, or any combination thereof. For example, UE 115-*b* may determine and/or adjust AGC and/or tracking associated with the second serving cell 205-*b* based on the additional reference signal 240-*b* (e.g., temporary reference signal). In this example, the AGC and/or tracking may enable the UE 115-*a* to establish wireless communications with the second serving cell 205-*b* and/or determine that the second serving cell 205-*b* has been activated.

The techniques described herein may provide for improved wireless communications by reducing durations of interruption periods of active serving cells 205 (e.g., first serving cell 205-*a*) which are attributable to the activation/deactivation of other serving cells 205 (e.g., second serving cell 205-*b*). In particular, by receiving reference signals (e.g., temporary reference signals) on the first serving cell 205-*a* which are to remain active, the UE 115-*a* may be able to determine and/or adjust information (e.g., AGC, time/frequency tracking) associated with the first serving cell 205-*c* which is to remain active. This information determined based on the reference signals may thereby reduce a duration of interruptions, and enable the UE 115-*a* to resume wireless communications on the first serving cell 205-*a*. By reducing durations of interruption periods of serving cells 205 at the UE 115-*a*, techniques described herein may improve the efficiency and reliability of wireless communications, and improve overall user experience.

Figure 3:
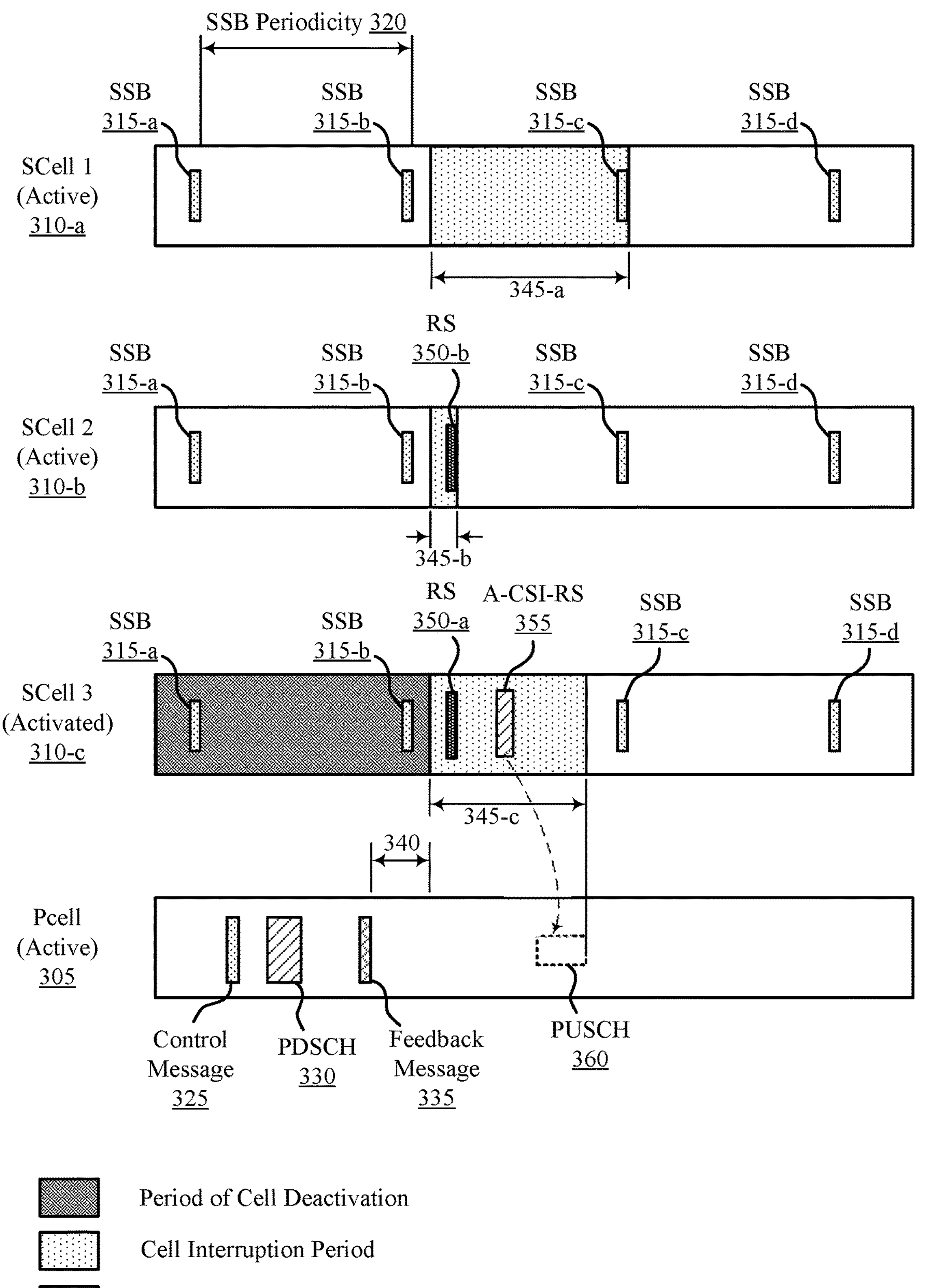
FIG. 3 illustrates an example of a resource allocation scheme that supports techniques for serving cell activation and deactivation using reference signals in accordance with aspects of the present disclosure.

FIG. 3 illustrates an example of a resource allocation scheme 300 that supports techniques for serving cell activation and deactivation using reference signals in accordance with aspects of the present disclosure. In some examples, resource allocation scheme 300 may implement, or be implemented by, aspects of wireless communications system 100, wireless communications system 200, or both. The resource allocation scheme 300 may enable improved activation and deactivation of serving cells, while reducing durations of interruptions on serving cells which are to remain active.

The resource allocation scheme 300 may include a first serving cell 305 (e.g., PCell 305), and three additional serving cells 310 (e.g., first SCell 310-*a*, second SCell 310-*b*, third SCell 310-*c*). In some aspects, the resource allocation scheme 300 illustrated in FIG. 3 illustrates an activation of the third SCell 310-*c*. In this example, each of the PCell 305, the first SCell 305-*a*, and the second SCell 305-*b* are to remain active. Additionally, the resource allocation scheme 300 illustrates how techniques described herein may be implemented on the second SCell 310-*b* in order to reduce a duration of an interruption period 345-*b* associated with the second SCell 310-*b* relative to a duration of an interruption period 345-*a* associated with the first SCell 310-*a*.

In the example illustrated in FIG. 3, each of the SCells 310 (e.g., first SCell 310-*a*, second SCell 310-*b*, third SCell 310-*c*) may be associated with a common frequency band (e.g., intra-band carrier aggregation). In some aspects, a UE 115 may be configured to communicate with a base station 105 via each of the active serving cells 305 and 310 (e.g., PCell 305, first SCell 310-*a*, and the second SCell 310-*b*). In this example, UE 115 may be further configured to communicate with the base station 105 via the third SCell 310-*c* once the third SCell 310-*c* has been activated (e.g., after the expiration of the interruption period 345-*c* associated with the third SCell 310-*c*). In some cases, the base station 105 may be configured to transmit SSB messages 315 to the UE 115 via each of the serving cells 305 and 310 according to an SSB periodicity 320. For example, in the context of an NR access technology, the base station 105 may transmit an SSB message 315 according to a 10 ms SSB periodicity 320, a 20 ms SSB periodicity 320, or another duration.

In some aspects, the UE 115 may receive, via the PCell 305, a control message (e.g., DCI message) which schedules a PDSCH transmission 330 (e.g., MAC-CE message) from the base station 105 to the UE 115. Subsequently, the UE 115 may receive the PDSCH transmission 330 (e.g., MAC-CE message) based on the control message 325. In this example, the PDSCH transmission 330 may include an indication to activate the third SCell 310-*c*. The UE 115 may transmit, to the base station 105 via the PCell 305, a feedback message 335 (e.g., ACK message) in response to receiving the indication to activate the third SCell 310-*c* via the PDSCH transmission 330.

In some aspects, the control message 325 (e.g., DCI message), the PDSCH transmission 330 (e.g., MAC-CE message), or both, may include an indication that reference signals 350 (e.g., temporary reference signals 350) on one or more serving cells 305 and/or 310 have been activated (e.g., triggered, initiated). For example, as shown in FIG. 3, the control message 325 and/or the PDSCH transmission 330 may include an indication that the reference signals 350 on the second SCell 310-*b* and/or the third SCell 310-*c* have been activated. In this regard, the UE 115 may be configured to determine that the reference signals 350 on the second and/or third SCell 310-*b*, 310-*c* have been activated based on explicit indications within the control message 325 and/or PDSCH transmission 330. Additionally or alternatively, the UE 115 may be configured to implicitly determine that the reference signals 350 on the second and/or third SCell 310-*b*, 310-*c* have been activated based on the activation/deactivation of the third SCell 310-*c*. In such cases, the UE 115 may determine that the reference signals 350 on the second and/or third SCell 310-*b*, 310-*c* have been activated without any explicit indication from the base station 105.

In some aspects, transmission of the feedback message 335 may trigger an interruption period 345 on each of the active serving cells 310 which are within the same frequency band as the third SCell 310-*c* being activated. For example, transmission of the feedback message 335 may trigger an interruption period 345-*a* and 345-*b* on the first SCell 310-*a* and the second SCell 310-*b*, respectively. Additionally, the transmission of the feedback message 335 may trigger an interruption period 345-*c* on the third SCell 310-*c* while the third SCell 310-*c* is being activated. In some cases, the interruption periods 345 may be attributable to the process of retuning of common antennas or antenna arrays used across the various serving cells 305 and 310, thereby resulting in an interruption of wireless communications on the respective serving cells 310. In some aspects, the interruption periods 345 within the respective serving cells 310-*a*, 310-*b*, and 310-*c* may begin after a duration 340 from the transmission of the feedback message 335. For example, in some wireless communications systems, the duration 340 from the transmission of the feedback message 335 to the beginning of the interruption periods 345 may be approximately 3 ms.

In some wireless communications systems, in order to reduce a duration of the interruption period 345-*b* on the third SCell 310-*c*, the UE 115 may receive a reference signal 350-*a* (e.g., temporary reference signal 350-*a*) via the third SCell 310-*c*. The reference signal 350-*a* may be received during the interruption period 345-*c* associated with the third SCell 310-*c*. In some aspects, the UE 115 may determine and/or adjust AGC associated with the third SCell 310-*c*, tracking (e.g., time tracking, frequency tracking) associated with the third SCell 310-*b*, or any combination thereof, based on the reference signal 350-*a*. Additionally, the UE 115 may receive an aperiodic channel state information reference signal (e.g., A-CSI-RS 355) from the base station 105 via the third SCell 310-*c*. In some aspects, the UE 115 may perform one or more measurements on the A-CSI-RS 355 to determine the channel state of the third SCell 310-*c*. Subsequently, the UE 115 may transmit a channel quality indicator (CQI) report to the base station 105 via a physical uplink shared channel (PUSCH) transmission 360. The base station 105 may then be configured to determine the channel state of the third SCell 310-*c* based on the received CQI report (e.g., PUSCH transmission 360). Accordingly, both the UE 115 and the base station 105 may determine the channel state of the third SCell 310-*c* based on the A-CSI-RS 355 and/or PUSCH transmission 360, thereby terminating the interruption period 345-*c* upon transmission of the PUSCH transmission 360. In some aspects, the third SCell 310-*c* may be fully activated upon termination of the interruption period 345-*c*. Moreover, wireless communications may be established between the UE 115 and the base station 105 via the third SCell 310-*c* upon termination of the interruption period 345-*c*.

In some wireless communications systems, interruption periods 345 on serving cells which are attributable to the activation of another serving cell may last from the start of the interruption period 345 (e.g., duration 340 following the transmission of the feedback message 335) until an SSB message 315 may be acquired on the respective serving cell. For example, as shown in FIG. 3, the interruption period 345-*a* on the first SCell 310-*a* may last from the end of the duration 340 until the reception of the next SSB message 315-*c* on the first SCell 310-*a*. Depending on the SSB periodicity 320 (e.g., 10 ms, 20 ms) and the relative timing of the feedback message 335, this interruption period 345-*a* may last a significant amount of time, thereby preventing wireless communications over the first SCell 310-*a* throughout the interruption period 345-*a*.

Accordingly, to reduce a duration of interruption periods on serving cells which are to remain active which are attributable to activation/deactivation of other serving cells, techniques described herein may support the transmission/reception of reference signals on the serving cells which are to remain active. For example, as shown in FIG. 3, an interruption period 345-*b* on the second SCell 310-*b* may begin after the duration 340 (e.g., 3 ms) following the transmission of the feedback message 335. In some aspects, the UE 115 may receive a reference signal 350-*b* (e.g., temporary reference signal 350-*b*) via the second SCell 310-*b*. In some cases, the UE 115 may receive the reference signal 350-*b* using the same set of time resources as the reference signal 350-*a* received via the third SCell 310-*c*. For example, the base station 105 may transmit, and the UE 115 may receive, both reference signals 350-*a* and 350-*b* within the same slot, the same subframe, or both. Moreover, the reference signals 350-*a* and 350-*b* may be transmitted using the same or different parameters (e.g., same or different SCS).

In some aspects, the UE 115 may determine and/or adjust information associated with the second SCell 310-*b* (e.g., AGC, time tracking, frequency tracking) based on the reference signal 350-*b*. In some cases, the UE 115 may determine information associated with the second SCell 310-*b* based on the reference signal 350-*b* which ends the interruption period 345-*b* and enables the UE 115 to resume wireless communications with the second SCell 310-*b*. For example, the AGC and/or time/frequency tracking indicated in the reference signal 350-*b* may enable the UE 115 to resume wireless communications with the second SCell 310-*b*, and thereby trigger an end to the interruption period.

As may be seen in FIG. 3, the techniques described herein may significantly reduce a duration of interruption periods 345 which are attributable to activation/deactivation of other serving cells. For example, it may be appreciated that the techniques described herein may significantly reduce the duration of the interruption period 345-*b* on the second SCell 310-*b* relative to the interruption period 345-*a* on the first SCell 310-*a*. This reduction of the interruption period 345-*b* enabled by the techniques described herein may enable wireless communications to be restored over the second SCell 310-*b* in a more timely manner, thereby improving the efficiency and reliability of wireless communications within a wireless communications system (e.g., wireless communications system 100 or 200), and improving overall user experience.

Figure 4:
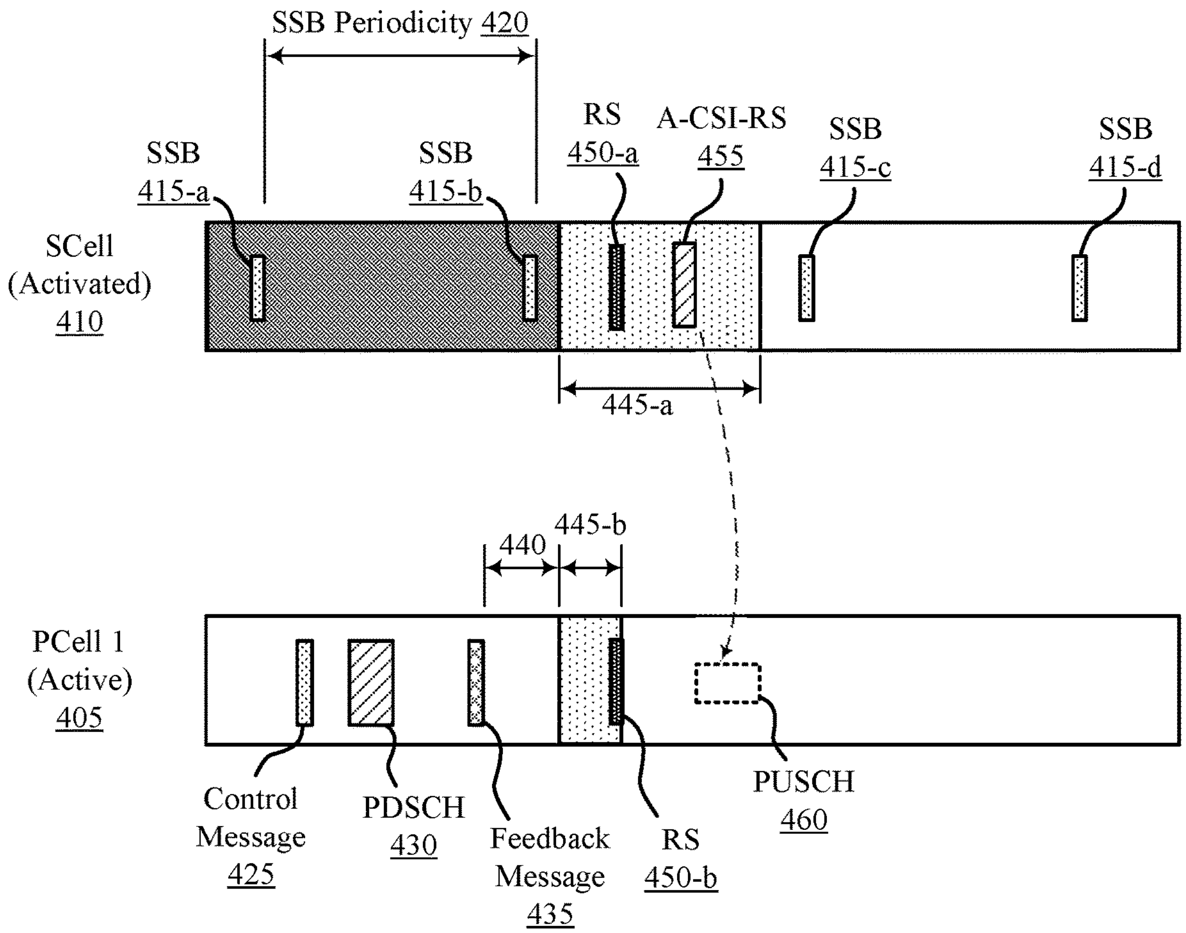
FIG. 4 illustrates an example of a resource allocation scheme that supports techniques for serving cell activation and deactivation using reference signals in accordance with aspects of the present disclosure.

FIG. 4 illustrates an example of a resource allocation scheme 400 that supports techniques for serving cell activation and deactivation using reference signals in accordance with aspects of the present disclosure. In some examples, resource allocation scheme 400 may implement, or be implemented by, aspects of wireless communications system 100, wireless communications system 200, or both. The resource allocation scheme 400 may enable improved activation and deactivation of serving cells, while reducing durations of interruptions on serving cells which are to remain active.

The resource allocation scheme 400 may include a first serving cell 405 (e.g., PCell 405), and an additional serving cell 410 (e.g., SCell 410). In some aspects, the resource allocation scheme 400 illustrated in FIG. 4 illustrates an activation of the SCell 410, where the PCell 405 is to remain active. In this example, the PCell 405 and the SCell 410 may be in the same frequency band (e.g., intra-band carrier aggregation). Additionally, the resource allocation scheme 400 may illustrate how techniques described herein may be implemented on the PCell 405 in order to reduce a duration of an interruption period 445-*b* associated with the PCell 405 which is attributable to the activation of the SCell 410.

In some cases, a base station 105 may be configured to transmit SSB messages 415 to the UE 115 via each of the serving cells according to an SSB periodicity 420 (e.g., 10 ms, 20 ms). In some aspects, the UE 115 may receive, via the PCell 405, a control message 425 (e.g., DCI message) which schedules a PDSCH transmission 430 (e.g., MAC-CE message) from the base station 105 to the UE 115. Subsequently, the UE 115 may receive the PDSCH transmission 430 (e.g., MAC-CE message) based on the control message 425. In this example, the PDSCH transmission 430 may include an indication to activate the SCell 410. The UE 115 may transmit, to the base station 105 via the PCell 405, a feedback message 435 (e.g., ACK message) in response to receiving the indication to activate the SCell 410.

In some aspects, the control message 425 (e.g., DCI message), the PDSCH transmission 430 (e.g., MAC-CE message), or both, may include an indication that reference signals 450 (e.g., temporary reference signals 450) on the PCell 405 and/or the SCell 410 have been activated. In this regard, the UE 115 may be configured to determine that the reference signals 450 on the PCell 405 and/or the SCell 410 have been activated based on explicit indications within the control message 425 and/or PDSCH transmission 430. Additionally or alternatively, the UE 115 may be configured to implicitly determine that the reference signals 450 on the PCell 405 and/or the SCell 410 have been activated based on the activation/deactivation of the SCell 410. In such cases, the UE 115 may determine that the reference signals 450 on the PCell 405 and/or the SCell 410 have been activated without any explicit indication from the base station 105.

As noted previously herein, transmission of the feedback message 435 may trigger interruption periods 445-*a* and 445-*b* on the SCell 410 and the PCell 405, respectively. In some cases, the interruption periods 345 may be attributable to the process of retuning of common antennas or antenna arrays used across the various serving cells, thereby resulting in an interruption of wireless communications on the respective serving cells. In some aspects, the interruption periods 445 within the PCell 405 and/or the SCell 410 may begin after a duration 440 from the transmission of the feedback message 435. For example, in some wireless communications systems, the duration 440 from the transmission of the feedback message 435 to the beginning of the interruption periods 445 may be approximately 3 ms.

In some aspects, in order to reduce a duration of the interruption period 445-*a* on the SCell 410, the UE 115 may receive a reference signal 450-*a* (e.g., temporary reference signal 450-*a*) via the SCell 410. The reference signal 450-*a* may be received during the interruption period 445-*a* associated with the SCell 410. In some aspects, the UE 115 may determine and/or adjust AGC associated with the SCell 410, tracking (e.g., time tracking, frequency tracking) associated with the SCell 410, or any combination thereof, based on the reference signal 450-*a*. Additionally, the UE 115 may receive an A-CSI-RS 455 from the base station 105 via the SCell 410. In some aspects, the UE 115 may perform one or more measurements on the A-CSI-RS 455 to determine the channel state of the SCell 410. Subsequently, the UE 115 may transmit a CQI report to the base station 105 via a PUSCH transmission 460. The base station 105 may then be configured to determine the channel state of the SCell 410 based on the received CQI report (e.g., PUSCH transmission 460). Accordingly, both the UE 115 and the base station 105 may determine the channel state of the SCell 410 based on the A-CSI-RS 455 and/or PUSCH transmission 460, thereby terminating the interruption period 445-*a* upon transmission of the PUSCH transmission 460. In some aspects, the SCell 410 may be fully activated upon termination of the interruption period 445-*a*. Moreover, wireless communications may be established between the UE 115 and the base station 105 via the SCell 410 upon termination of the interruption period 445-*a*.

In some aspects, the UE 115 may additionally receive a reference signal 450-*b* (e.g., temporary reference signal 450-*b*) via the PCell 405. In some cases, the UE 115 may receive the reference signal 450-*b* using the same set of time resources as the reference signal 450-*a* received via the SCell 410. For example, the base station 105 may transmit, and the UE 115 may receive, both reference signals 450-*a* and 450-*b* within the same slot, the same subframe, or both. Moreover, the reference signals 450-*a* and 450-*b* may be transmitted using the same or different parameters (e.g., same or different SCS).

In some aspects, the UE 115 may determine and/or adjust information associated with the PCell 405 (e.g., AGC, time tracking, frequency tracking) based on the reference signal 450-*b*. In some cases, the UE 115 may determine information associated with the PCell 405 based on the reference signal 450-*b* which ends the interruption period 445-*b* and enables the UE 115 to resume wireless communications with the PCell 405. For example, the AGC and/or tracking indicated in the reference signal 450-*b* may enable the UE 115 to resume wireless communications with the PCell 405, and thereby trigger an end to the interruption period.

As may be seen in FIG. 4, the techniques described herein may significantly reduce a duration of the interruption period 445-*b* on the PCell 405 which is attributable to activation of the SCell 410. This reduction of the interruption period 445-*b* enabled by the techniques described herein may enable wireless communications to be restored over the PCell 405 in a more timely manner, thereby improving the efficiency and reliability of wireless communications within a wireless communications system (e.g., wireless communications system 100 or 200), and improving overall user experience.

Figure 5:
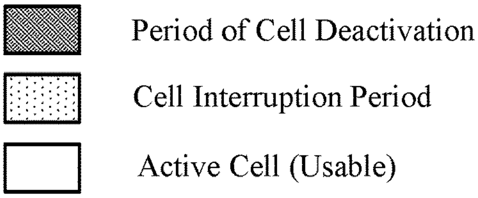
FIG. 5 illustrates an example of a resource allocation scheme that supports techniques for serving cell activation and deactivation using reference signals in accordance with aspects of the present disclosure.
Figure 5:
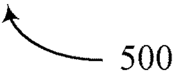

FIG. 5 illustrates an example of a resource allocation scheme 500 that supports techniques for serving cell activation and deactivation using reference signals in accordance with aspects of the present disclosure. In some examples, resource allocation scheme 500 may implement, or be implemented by, aspects of wireless communications system 100, wireless communications system 200, or both. The resource allocation scheme 500 may enable improved activation and deactivation of serving cells, while reducing durations of interruptions on serving cells which are to remain active.

The resource allocation scheme 500 may include a first serving cell 505 (e.g., PCell 505), and additional serving cells 510 (e.g., first SCell 510-*a*, second SCell 510-*b*). In some aspects, the resource allocation scheme 500 illustrated in FIG. 5 illustrates an activation of the second SCell 510-*b*, where the PCell 505 and the first SCell 510-*a* are to remain active. In this example, the first SCell 510-*a* and the second SCell 510-*b* may be in the same frequency band (e.g., intra-band carrier aggregation), where the PCell 605 is in a different frequency band. Additionally, the resource allocation scheme 500 may illustrate how techniques described herein may be implemented on the first SCell 510-*a* in order to reduce a duration of an interruption period 545-*a* associated with the first SCell 510-*a* which is attributable to the activation of the second SCell 510-*b*.

In some cases, a base station 105 may be configured to transmit SSB messages 515 to the UE 115 via each of the serving cells according to an SSB periodicity 520 (e.g., 10 m, 20 ms). In some aspects, the UE 115 may receive, via the PCell 505, a control message 525 (e.g., DCI message) which schedules a PDSCH transmission 530 (e.g., MAC-CE message) from the base station 105 to the UE 115. Subsequently, the UE 115 may receive the PDSCH transmission 530 (e.g., MAC-CE message) based on the control message 525. In this example, the PDSCH transmission 530 may include an indication to activate the second SCell 510-*b*. The UE 115 may transmit, to the base station 105 via the PCell 505, a feedback message 535 (e.g., ACK message) in response to receiving the indication to activate the second SCell 510-*b*.

In some aspects, the control message 525 (e.g., DCI message), the PDSCH transmission 530 (e.g., MAC-CE message), or both, may include an indication that reference signals 550 (e.g., temporary reference signals 550) on the first SCell 510-*a* and/or the second SCell 510-*b* have been activated. In this regard, the UE 115 may be configured to determine that the reference signals 550 on the SCells 510 have been activated based on explicit indications within the control message 525 and/or PDSCH transmission 530. Additionally or alternatively, the UE 115 may be configured to implicitly determine that the reference signals 550 on the first SCell 510-*a* and/or the second SCell 510-*b* have been activated based on the activation/deactivation of the second SCell 510-*b*. In such cases, the UE 115 may determine that the reference signals 550 on the first SCell 510-*a* and/or the second SCell 510-*b* have been activated without any explicit indication from the base station 105.

As noted previously herein, transmission of the feedback message 535 may trigger interruption periods 545-*a* and 545-*b* on the first SCell 510-*a* and the second SCell 510-*b*, respectively. In some cases, the interruption periods 545 may be attributable to the process of retuning of common antennas or antenna arrays used across the various serving cells, thereby resulting in an interruption of wireless communications on the respective serving cells. In some cases, the activation of the second SCell 510-*b* may not result in an interruption period on the PCell 505 where the PCell 505 is not in the same frequency band as the second SCell 510-*b*. In some aspects, the interruption periods 545 associated with the first SCell 510-*a* and/or the second SCell 510-*b* may begin after a duration 540 from the transmission of the feedback message 535. For example, in some wireless communications systems, the duration 540 from the transmission of the feedback message 535 to the beginning of the interruption periods 545 may be approximately 3 ms.

In some aspects, in order to reduce a duration of the interruption period 545-*a* on the second SCell 510-*b*, the UE 115 may receive a reference signal 550-*b* (e.g., temporary reference signal 550-*b*) via the second SCell 510-*b*. The reference signal 550-*b* may be received during the interruption period 545-*b* associated with the second SCell 510-*b*. In some aspects, the UE 115 may determine and/or adjust AGC associated with the second SCell 510-*b*, tracking (e.g., time tracking, frequency tracking) associated with the second SCell 510-*b*, or any combination thereof, based on the reference signal 550-*b*. Additionally, the UE 115 may receive an A-CSI-RS 555 from the base station 105 via the second SCell 510-*b*. In some aspects, the UE 115 may perform one or more measurements on the A-CSI-RS 555 to determine the channel state of the second SCell 510-*b*. Subsequently, the UE 115 may transmit a CQI report to the base station 105 via a PUSCH transmission 560. The base station 105 may then be configured to determine the channel state of the second SCell 510-*b* based on the received CQI report (e.g., PUSCH transmission 560). Accordingly, both the UE 115 and the base station 105 may determine the channel state of the second SCell 510-*b* based on the A-CSI-RS 555 and/or PUSCH transmission 560, thereby terminating the interruption period 545-*b* upon transmission of the PUSCH transmission 560. In some aspects, the second SCell 510-*b* may be fully activated upon termination of the interruption period 545-*b*. Moreover, wireless communications may be established between the UE 115 and the base station 105 via the second SCell 510-*b* upon termination of the interruption period 545-*b*.

In some aspects, the UE 115 may additionally receive a reference signal 550-*a* (e.g., temporary reference signal 550-*a*) via the first SCell 510-*a*. In some cases, the UE 115 may receive the reference signal 550-*a* using the same set of time resources as the reference signal 550-*b* received via the second SCell 510-*b*. For example, the base station 105 may transmit, and the UE 115 may receive, both reference signals 550-*a* and 550-*b* within the same slot, the same subframe, or both. Moreover, the reference signals 550-*a* and 550-*b* may be transmitted using the same or different parameters (e.g., same or different SCS).

In some aspects, the UE 115 may determine and/or adjust information associated with the first SCell 510-*a* (e.g., AGC, time tracking, frequency tracking) based on the reference signal 550-*a*. In some cases, the UE 115 may determine information associated with the first SCell 510-*a* based on the reference signal 550-*a* which ends the interruption period 545-*a* and enables the UE 115 to resume wireless communications with the first SCell 510-*a*. For example, the AGC and/or time/frequency tracking indicated in the reference signal 550-*a* may enable the UE 115 to resume wireless communications with the first SCell 510-*a*, and thereby trigger an end to the interruption period 545-*a*.

As may be seen in FIG. 5, the techniques described herein may significantly reduce a duration of the interruption period 545-*a* on the first SCell 510-*a* which is attributable to activation of the second SCell 510-*b*. This reduction of the interruption period 545-*a* enabled by the techniques described herein may enable wireless communications to be restored over the first SCell 510-*a* in a more timely manner, thereby improving the efficiency and reliability of wireless communications within a wireless communications system (e.g., wireless communications system 100 or 200), and improving overall user experience.

Figure 6:
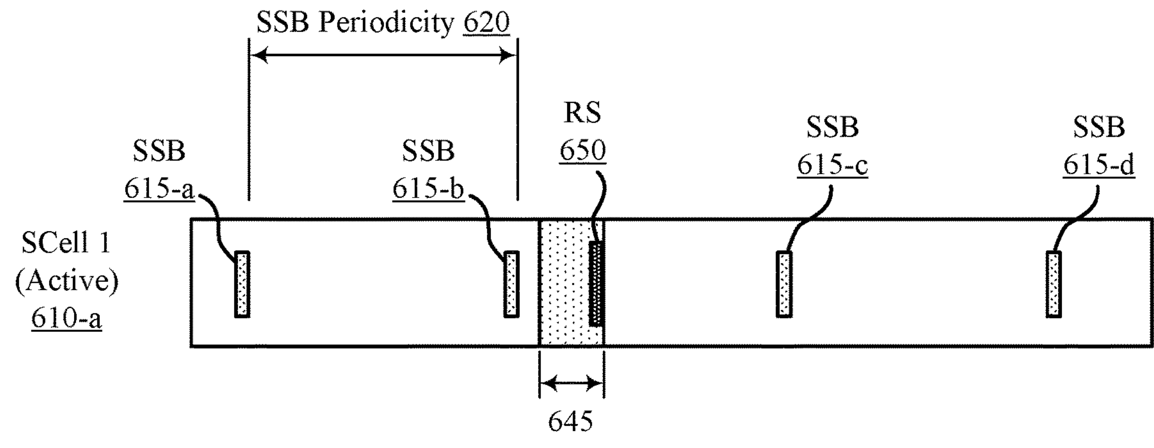
FIG. 6 illustrates an example of a resource allocation scheme that supports techniques for serving cell activation and deactivation using reference signals in accordance with aspects of the present disclosure.
Figure 6:
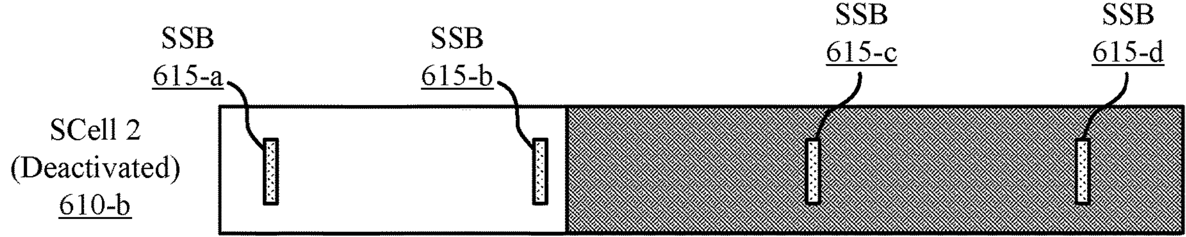
Figure 6:
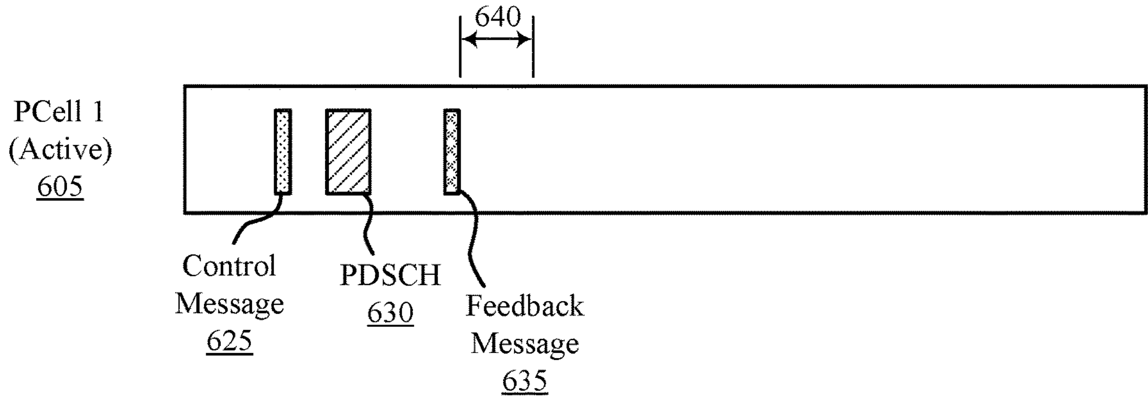

FIG. 6 illustrates an example of a resource allocation scheme 600 that supports techniques for serving cell activation and deactivation using reference signals in accordance with aspects of the present disclosure. In some examples, resource allocation scheme 600 may implement, or be implemented by, aspects of wireless communications system 100, wireless communications system 200, or both. The resource allocation scheme 600 may enable improved activation and deactivation of serving cells, while reducing durations of interruptions on serving cells which are to remain active.

The resource allocation scheme 600 may include a first serving cell 605 (e.g., PCell 605), and additional serving cells 610 (e.g., first SCell 610-*a*, second SCell 610-*b*). In some aspects, the resource allocation scheme 600 illustrated in FIG. 6 illustrates a deactivation of the second SCell 610-*b*, where the PCell 605 and the first SCell 610-*a* are to remain active. In this example, the first SCell 610-*a* and the second SCell 610-*b* may be in the same frequency band (e.g., intra-band carrier aggregation), where the PCell 605 is in a different frequency band. Additionally, the resource allocation scheme 600 may illustrate how techniques described herein may be implemented on the first SCell 610-*a* in order to reduce a duration of an interruption period 645-*a* associated with the first SCell 610-*a* which is attributable to the deactivation of the second SCell 610-*b*.

In some cases, a base station 105 may be configured to transmit SSB messages 615 to the UE 115 via each of the serving cells according to an SSB periodicity 620 (e.g., 10 m, 20 ms). In some aspects, the UE 115 may receive, via the PCell 605, a control message 625 (e.g., DCI message) which schedules a PDSCH transmission 630 (e.g., MAC-CE message) from the base station 105 to the UE 115. Subsequently, the UE 115 may receive the PDSCH transmission 630 (e.g., MAC-CE message) based on the control message 625. In this example, the PDSCH transmission 630 may include an indication to deactivate the second SCell 610-*b*. The UE 115 may transmit, to the base station 105 via the PCell 605, a feedback message 635 (e.g., ACK message) in response to receiving the indication to deactivate the second SCell 610-*b*.

In some aspects, the control message 625 (e.g., DCI message), the PDSCH transmission 630 (e.g., MAC-CE message), or both, may include an indication that reference signals 650 (e.g., temporary reference signals 650) on the first SCell 610-*a* have been activated. In this regard, the UE 115 may be configured to determine that the reference signals 650 on the first SCell 610-*a* have been activated based on explicit indications within the control message 525 and/or PDSCH transmission 630. Additionally or alternatively, the UE 115 may be configured to implicitly determine that the reference signals 650 on the first SCell 610-*a* have been activated based on the deactivation of the second SCell 610-*b*. In such cases, the UE 115 may determine that the reference signals 650 on the first SCell 610-*a* have been activated without any explicit indication from the base station 105.

As noted previously herein, transmission of the feedback message 635 may trigger an interruption period 645 on the first SCell 610-*a*. In some cases, the interruption period 645 may be attributable to the process of retuning of common antennas or antenna arrays used across the various serving cells, thereby resulting in an interruption of wireless communications on the first SCell 610-*a*. In some cases, the activation of the second SCell 610-*b* may not result in an interruption period on the PCell 605 where the PCell 605 is not in the same frequency band as the second SCell 610-*b*. In some aspects, the interruption period 645 associated with the first SCell 610 may begin after a duration 640 from the transmission of the feedback message 635. For example, in some wireless communications systems, the duration 640 from the transmission of the feedback message 635 to the beginning of the interruption periods 645 may be approximately 3 ms.

In some aspects, the deactivation of the second SCell 610-*b* may be complete after the duration 640 following the transmission of the feedback message 635. For example, the deactivation of the second SCell 610-*b* may be complete approximately 3 ms following the transmission of the feedback message 635. In this regard, the UE 115 and/or the base station 105 may determine that the second SCell 610-*b* has been deactivated based on the transmission/reception of the feedback message 635.

In some aspects, the UE 115 may receive a reference signal 650 (e.g., temporary reference signal 650) via the first SCell 610-*a*. In some aspects, the UE 115 may determine and/or adjust information associated with the first SCell 610-*a* (e.g., AGC, time tracking, frequency tracking) based on the reference signal 650. In some cases, the UE 115 may determine information associated with the first SCell 610-*a* based on the reference signal 650 which ends the interruption period 645 and enables the UE 115 to resume wireless communications with the first SCell 610-*a*. For example, the AGC and/or time/frequency tracking indicated in the reference signal 650 may enable the UE 115 to resume wireless communications with the first SCell 610-*a*, and thereby trigger an end to the interruption period 645.

As may be seen in FIG. 6, the techniques described herein may significantly reduce a duration of the interruption period 645 on the first SCell 610-*a* which is attributable to deactivation of the second SCell 610-*b*. This reduction of the interruption period 645 enabled by the techniques described herein may enable wireless communications to be restored over the first SCell 610-*a* in a more timely manner, thereby improving the efficiency and reliability of wireless communications within a wireless communications system (e.g., wireless communications system 100 or 200), and improving overall user experience.

Figure 7:
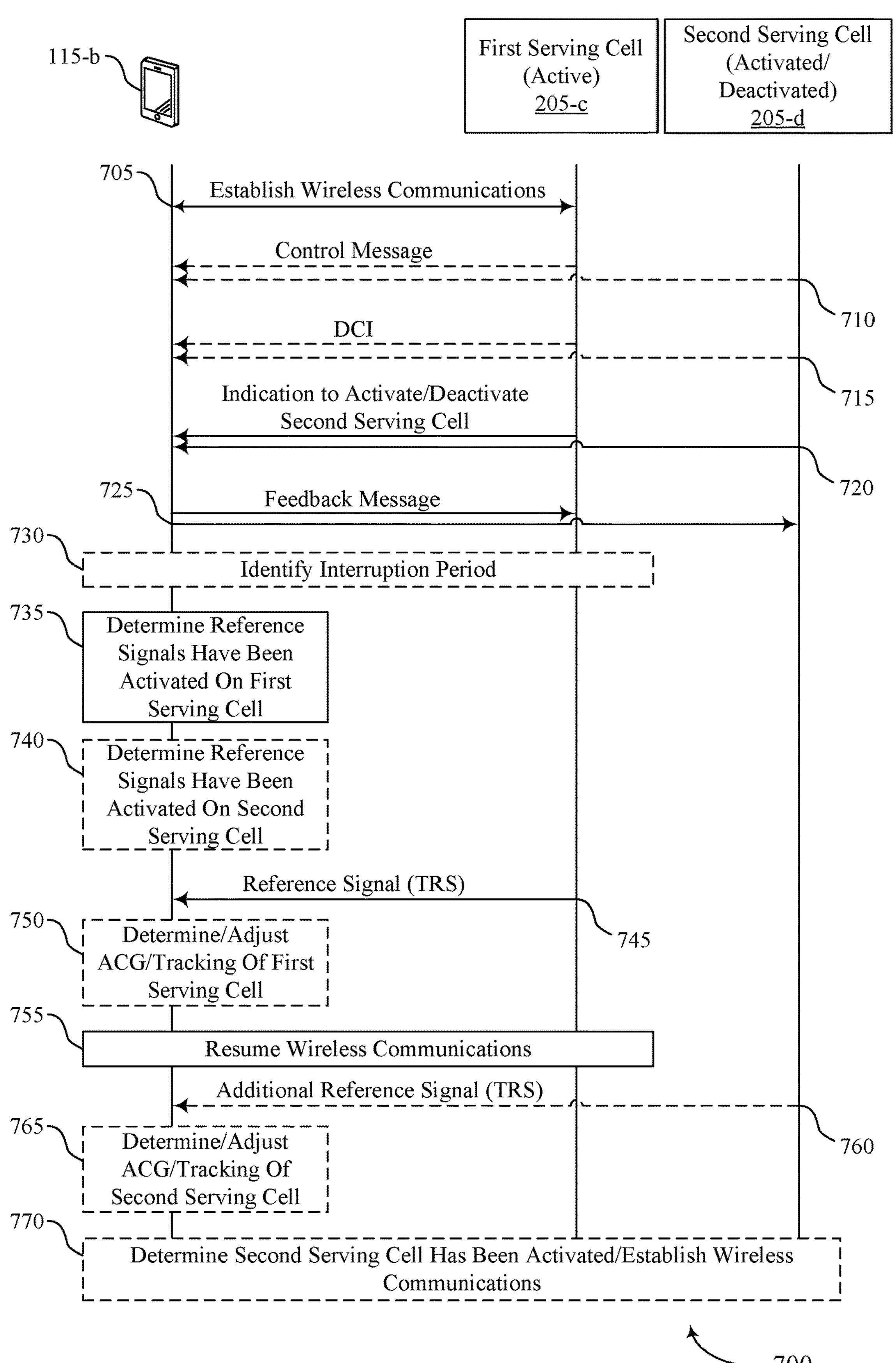
FIG. 7 illustrates an example of a process flow that supports techniques for serving cell activation and deactivation using reference signals in accordance with aspects of the present disclosure.

FIG. 7 illustrates an example of a process flow 700 that supports techniques for serving cell activation and deactivation using reference signals in accordance with aspects of the present disclosure. In some examples, process flow 700 may implement, or be implemented by, aspects of wireless communications system 100, wireless communications system 200, resource allocation schemes 300, 400, 500, 600, or any combination thereof. For example, the process flow 700 may illustrate a UE 115-*b* receiving an indication that a second serving cell has been activated or deactivated, determining an interruption of wireless communications on a first serving cell, receiving a reference signal on the first serving cell, and resuming wireless communications on the first serving cell based on receiving the reference signal, as described with reference to FIGS. 1-6, among other aspects.

The process flow 700 may include a UE 115-*b*, a first serving cell 205-*c*, and a second serving cell 205-*d*, which may be examples of UEs 115 and serving cells 205 as described with reference to FIGS. 1 and 2. In particular, the first serving cell 205-*c* may include an example of a serving cell 205 at the UE 115-*b* which is to remain active, and the second serving cell 205-*d* may include an example of a serving cell 205 which is to be activated or deactivated. In some aspects, the first serving cell 205-*c* and the second serving cell 205-*d* may be associated with (e.g., supported by) a single base station 105 of a wireless communications system (e.g., base station 105-*a* illustrated in FIG. 2). Additionally or alternatively, the first cell 205-*c* and the second cell 205-*d* may be associated with (e.g., supported by) different base stations 105, for example in the context of dual connectivity scenarios.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 705, the UE 115-*b* may establish wireless communications with the first serving cell 205-*c*. In some aspects, the UE 115-*b* may establish the wireless communications with the first serving cell 205-*c* by initiating or otherwise performing a setup procedure with the first serving cell 205-*c*. In some aspects, the first serving cell 205-*c* and the second serving cell 205-*d* may be associated with the same frequency band (e.g., intra-band carrier aggregation). In some aspects, the first serving cell 205-*c*, the second serving cell

205-*d*, or both, may include a PCell, an SCell, a PSCell of an SCG, or any combination thereof. For example, in cases where the first serving cell 205-*c* includes a PCell, the second serving cell 205-*d* may include an SCell. By way of another example, in cases where the first serving cell 205-*c* includes an SCell, the second serving cell 205-*d* may include an additional SCell. Moreover, in cases where the first serving cell 205-*c* includes a PSCell of an SCG, the second serving cell 205-*c* may include an SCell of the SCG.

In some cases, the first serving cell 205-*c*, the second serving cell 205-*d*, or both, may be associated with a given radio access technology, such as a 5G radio access technology, an NR access technology, a 4G radio access technology, an LTE radio access technology, or any combination thereof. In some cases, the second serving cell 205-*c* may be associated with the same or different radio access technology as the radio access technology associated with the first serving cell 205-*c*. For example, in cases where the first serving cell 205-*c* is associated with a 5G or NR access technology, the second serving cell 205-*d* may be associated with a 4G radio access technology, an LTE radio access technology, or both. Moreover, in some cases, the first serving cell 205-*c* and the second serving cell 205-*d* may be associated with different frequency bands associated with a common radio access technology. For example, in some cases, both the first and second serving cells 205-*c* and 205-*d* may be associated with an NR access technology, where the first serving cell 205-*c* is associated an FR1 frequency band of the NR access technology and the second serving cell 205-*d* is associated an FR2 frequency band of the NR access technology.

At 710, the UE 115-*b* may receive a control message via the first serving cell 205-*c*, the second serving cell 205-*d*, or both. In some aspects, the control message may include an indication of a set of resources usable by the UE 115-*b* to receive reference signals (e.g., temporary reference signals) from the base station via the first serving cell 205-*c*, the second serving cell 205-*c*, or both. The set of resources may include a set of time resources, a set of frequency resources, a set of spatial resources, or any combination thereof. The control message may include an RRC message, an SIB message, an SSB message, or any combination thereof. In some aspects, the UE 115-*b* may receive the control message at 710 based on establishing the wireless communications with the first serving cell 205-*c* at 705.

At 715, the UE 115-*b* may receive, from the base station via the first serving cell 205-*c* and/or the second serving cell 205-*d*, a DCI message scheduling a downlink transmission (e.g., PDSCH transmission) from the base station to the UE 115-*b*. The DCI message may be transmitted via PDCCH resources. In some aspects, the UE 115-*b* may receive the DCI message at 710 based on establishing the wireless communications with the first serving cell 205-*c* at 705, receiving the control message (e.g., RRC message, SIB message, SSB message) at 710, or any combination thereof.

In some aspects, the DCI message may include an indication that the reference signals (e.g., temporary reference signals) associated with the first serving cell 205-*c*, the second serving cell 205-*d*, or both, have been activated (e.g., triggered, initiated). In this regard, the UE 115-*b* may be configured to determine that the UE 115-*b* may monitor for the reference signals on the first serving cell 205-*c*, the second serving cell 205-*d*, or both, based on the indication in the DCI message.

At 720, the UE 115-*b* may receive, from the base station via the first serving cell 205-*c* and/or the second serving cell 205-*d*, an indication to activate or deactivate the second serving cell 205-*d*. In some aspects, the indication to activate or deactivate the second serving cell 205-*d* may be indicated via a MAC-CE message. In some aspects, the base station may transmit, and the UE 115-*b* may receive, the indication to activate or deactivate the second serving cell 205-*d* based on the DCI message at 715. For example, the DCI message 715 received at 715 may schedule a PDSCH transmission (e.g., MAC-CE message) at 720, where the PDSCH transmission includes the indication to activate or deactivate the second serving cell 205-*d*.

In cases where the indication to activate or deactivate the second serving cell 205-*d* is conveyed via a MAC-CE message, the MAC-CE message may include an indication that the reference signals (e.g., temporary reference signals) associated with the first serving cell 205-*c*, the second serving cell 205-*d*, or both, have been activated (e.g., triggered, initiated). In this regard, the DCI message received at 715, the MAC-CE message received at 720, or both, may include an indication that the reference signals associated with the first serving cell 205-*c* and/or second serving cell 205-*d* have been activated. In cases where reference signals associated with both the first serving cell 205-*c* and the second serving cell 205-*d* are being triggered/activated (e.g., in cases where the second serving cell 205-*d* is being activated), the reference signals associated with the respective serving cells 205 may be activated separately or together (e.g., in tandem). For example, the DCI message and/or the MAC-CE message may activate temporary reference signals on both the first and second serving cells 205. By way of another example, the DCI message may activate temporary reference signals on the first serving cell 205-*c*, and the MAC-CE message may activate temporary reference signals on the second serving cell 205-*d* (or vice versa).

At 725, the UE 115-*b* may transmit a feedback message to the base station via the first serving cell 205-*c*, the second serving cell 205-*d*, or both. In some aspects, the UE 115-*b* may transmit the feedback message to the base station based on (e.g., in response to) receiving the indication to activate or deactivate the second serving cell 205-*d*. The feedback message may include an ACK message, a NACK message, or both. For example, in cases where the indication includes an activation of the second serving cell 205-*d*, the UE 115-*b* may transmit an ACK message in response to the activation of the second serving cell 205-*d*. By way of another example, in cases where the indication includes a deactivation of the second serving cell 205-*d*, the UE 115-*b* may transmit an ACK message in response to the deactivation of the second serving cell 205-*d*. In this example, the UE 115-*b* and/or the base station may determine that the second serving cell 205-*d* has been deactivated based on transmitting/receiving the feedback message at 725.

At 730, the UE 115-*b*, the base station associated with the serving cells 205, or both, may identify an interruption period of the wireless communications between the UE 115-*b* and the first serving cell 205-*c*. However, it is noted herein that the UE 115-*b*, the base station, or both, need not actually identify the interruption period in all circumstances. In some aspects, the UE 115-*b* and/or the base station may identify the interruption period based on receiving/transmitting the indication to activate or deactivate the second serving cell 205-*d* at 720. Additionally or alternatively, the UE 115-*b* and/or the base station may identify the interruption period at 735 based on transmitting/receiving the feedback message at 725. For example, in some cases, the interruption period of the wireless communications between the UE 115-*b* and the first serving cell 205-*b* may begin based on the UE 115-*b* transmitting the feedback message at 725. For instance, as discussed previously herein, the interruption period may begin after a certain duration of time (e.g., 3 ms) after the transmission of the feedback message. In this regard, transmission of the feedback message may initiate or trigger the start of the interruption period.

At 735, the UE 115-*b* may determine that the reference signals (e.g., temporary reference signals) associated with the first serving cell 205-*c* have been activated. In some aspects, the UE 115-*b* may determine that the reference signals associated with the first serving cell 205-*c* have been activated based on an implicit determination, based on explicit signaling received from the base station, or both. In particular, the UE 115-*b* may be configured to determine that the reference signals associated with the first serving cell 205-*c* have been activated based on receiving the DCI message at 710, receiving the indication to activate/deactivate the second serving cell (e.g., MAC-CE message) at 715, or both.

For example, in cases where the DCI message received at 715, the MAC-CE message received at 720, or both, include an indication that the reference signals associated with the first serving cell 205-*c* have been activated, the UE 115-*b* may determine that the reference signals have been activated based on the explicit signaling in the DCI message and/or MAC-CE message. Conversely, the UE 115-*b* may be configured to determine that the reference signals associated with the first serving cell 205-*c* have been activated implicitly (e.g., without explicit signaling from the base station). For example, in some cases, the UE 115-*b* may be configured to determine that the reference signals associated with the first serving cell 205-*c* have been activated based on the indication to activate/deactivate the second serving cell 205-*d*. In this regard, the UE 115-*b* may be configured to determine that reference signals associated with active serving cells 205 (e.g., first serving cell 205-*c*) which are to remain active have been triggered/activated by virtue of the second serving cell 205-*d* being activated or deactivated.

At 740, the UE 115-*b* may determine that the reference signals (e.g., temporary reference signals) associated with the second serving cell 205-*d* have been activated. In some aspects, the UE 115-*b* may determine that the reference signals associated with the second serving cell 205-*d* have been activated based on an implicit determination, based on explicit signaling received from the base station, or both. In particular, the UE 115-*b* may be configured to determine that the reference signals associated with the second serving cell 205-*d* have been activated based on receiving the DCI message at 710, receiving the indication to activate/deactivate the second serving cell (e.g., MAC-CE message) at 715, determining whether the reference signals associated with the first serving cell 205-*c* have been activated at 740, or any combination thereof. In some cases, reference signals associated with the first and second serving cells 205-*c* and 205-*d* may be activated (or indicated as being activated to the UE 115-*b*) separately or together. In this regard, any discussion regarding the activation of reference signals associated with the first serving cell 205-*c* (or determining whether the reference signals are activated) at 735 may be regarded as applying to the determination as to whether the reference signals associated with the second serving cell 205-*d* are activated at 740.

At 745, the UE 115-*b* may receive a reference signal from the base station via the first serving cell 205-*c*. In some aspects, the UE 115-*a* may receive the reference signal a duration of time after receipt of the indication to activate/deactivate the second serving cell 205-*d* and during the interruption period of wireless communications with the first serving cell 205-*c*. The reference signal may include, but is not limited to, a temporary reference signal. For example, the temporary reference signal may include a tracking reference signal, a non-zero power CSI-RS configured as a tracking reference signal, or both. In some aspects, the UE 115-*b* may receive the reference signal at 745 based on receiving the control message at 710, receiving the DCI messages and/or indications to activate/deactivate the second serving cell 205-*c* at 715 and 720, transmitting the feedback message at 725, identifying the interruption period at 735, determining that the reference signals associated with the first serving cell 205-*c* have been activated at 735, or any combination thereof. For example, in cases where the control message received at 710 includes an indication of the set of resources usable by the UE 115-*b* for receiving reference signals, the UE 115-*b* may receive the reference signals at 745 based on (e.g., using, according to) the set of resources indicated in the control message.

At 750, the UE 115-*b* may determine and/or adjust AGC associated with the first serving cell 205-*c*, tracking (e.g., time tracking, frequency tracking) associated with the first serving cell 205-*c*, or any combination thereof. In some aspects, the UE 115-*b* may determine/adjust the AGC and/or time/frequency tracking during the interruption period of wireless communications between the UE 115-*b* and the first serving cell 205-*c* which was identified at 730. In some aspects, the UE 115-*b* may determine/adjust the AGC and/or tracking associated with the first serving cell 205-*c* based on the reference signal (e.g., temporary reference signal) received at 745. For example, the reference signals received at 745 may include an indication of AGC and/or tracking associated with the first serving cell 205-*c*.

At 755, the UE 115-*b* may resume the wireless communications with the first serving cell 205-*c*. In some cases, the reference signal received at 750 may trigger an end to the interruption period, and the UE 115-*b* may resume the wireless communications with the first serving cell 205-*c* based on the interruption period ending. For example, UE 115-*b* may determine and/or adjust AGC and/or tracking associated with the first serving cell 205-*c* based on the reference signal (e.g., temporary reference signal) received at 745. In this example, the AGC and/or time/frequency tracking may enable the UE 115-*b* to resume wireless communications with the first serving cell 205-*c*, and thereby trigger an end to the interruption period.

In cases where the indication to activate/deactivate the second serving cell 205-*c* received at 720 includes an activation of the second serving cell 205-*d*, the process flow 700 may proceed to 760.

At 760, the UE 115-*b* may receive an additional reference signal from the base station via the second serving cell 205-*c*. The additional reference signal may include, but is not limited to, a temporary reference signal. In some aspects, the UE 115-*b* may receive the additional reference signal at 765 based on receiving the control message at 710, receiving the DCI messages and/or indication to activate the second serving cell 205-*d* at 715 and 720, transmitting the feedback message at 725, determining that the reference signals associated with the second serving cell 205-*d* have been activated at 740, or any combination thereof. For example, in cases where the control message received at 710 includes an indication of the set of resources usable by the UE 115-*b* for receiving reference signals, the UE 115-*b* may receive the additional reference signal at 760 based on (e.g., using, according to) the set of resources indicated in the control message.

In some cases, the reference signal received via the first serving cell 205-*c* at 750 and the additional reference signal received via the second serving cell 205-*d* at 760 may be received using a common set of time resources. For example, the base station associated with the serving cells 205-*c* and 205-*d* may transmit, and the UE 115-*b* may receive, both the first reference signal at 745 and the additional reference signal at 760 within the same slot, the same subframe, or both. Additionally or alternatively, the reference signals received via the first and second serving cells 205-*c* and 205-*d* at 750 and 765, respectively, may be received/transmitted using the same characteristics or parameters including, but not limited to, SCS. For example, in some cases, the reference signal received via the first serving cell 205-*c* at 745 and the additional reference signal received via the second serving cell 205-*d* at 760 may be transmitted by the base station (and received by the UE 115-*b*) using a common SCS. In other cases, the reference signal received via the first serving cell 205-*c* at 750 and the additional reference signal received via the second serving cell 205-*d* at 765 may be transmitted by the base station (and received by the UE 115-*b*) using different SCSs.

At 765, the UE 115-*b* may determine and/or adjust AGC associated with the second serving cell 205-*d*, tracking (e.g., time tracking, frequency tracking) associated with the second serving cell 205-*d*, or any combination thereof. In some aspects, the UE 115-*b* may determine/adjust the AGC and/or tracking associated with the second serving cell 205-*d* based on the additional reference signal (e.g., temporary reference signal) received at 760. For example, the additional reference signal received at 760 may include an indication of AGC and/or tracking associated with the second serving cell 205-*d*.

At 770, the UE 115-*b*, the base station, or both, may determine that the second serving cell 205-*d* has been activated, establish wireless communications with the second serving cell 205-*d*, or both. In some aspects, the UE 115-*b* may determine that the second serving cell 205-*d* has been activated and/or establish wireless communications with the second serving cell 205-*d* based on receiving the additional reference signal at 760, determining/adjusting the AGC and/or tracking associated with the second serving cell 205-*d* at 765, or any combination thereof. For example, UE 115-*b* may determine and/or adjust AGC and/or tracking associated with the second serving cell 205-*d* based on the additional reference signal (e.g., temporary reference signal) received at 760. In this example, the AGC and/or time/frequency tracking may enable the UE 115-*b* to establish wireless communications with the second serving cell 205-*d* and/or determine that the second serving cell 205-*d* has been activated.

The techniques described herein may provide for improved wireless communications by reducing durations of interruption periods of active serving cells 205 (e.g., first serving cell 205-*c*) which are attributable to the activation/deactivation of other serving cells 205 (e.g., second serving cell 205-*d*). In particular, by receiving reference signals (e.g., temporary reference signals) on the first serving cell 205-*c* which are to remain active, the UE 115-*b* may be able to determine and/or adjust information (e.g., AGC, time/frequency tracking) associated with the first serving cell 205-*c* which is to remain active. This information determined based on the reference signals may thereby reduce a duration of interruptions, and enable the UE 115-*b* to resume wireless communications on the first serving cell 205-*c*. By reducing durations of interruption periods of serving cells 205 at the UE 115-*b*, techniques described herein may improve the efficiency and reliability of wireless communications, and improve overall user experience.

Figure 8:
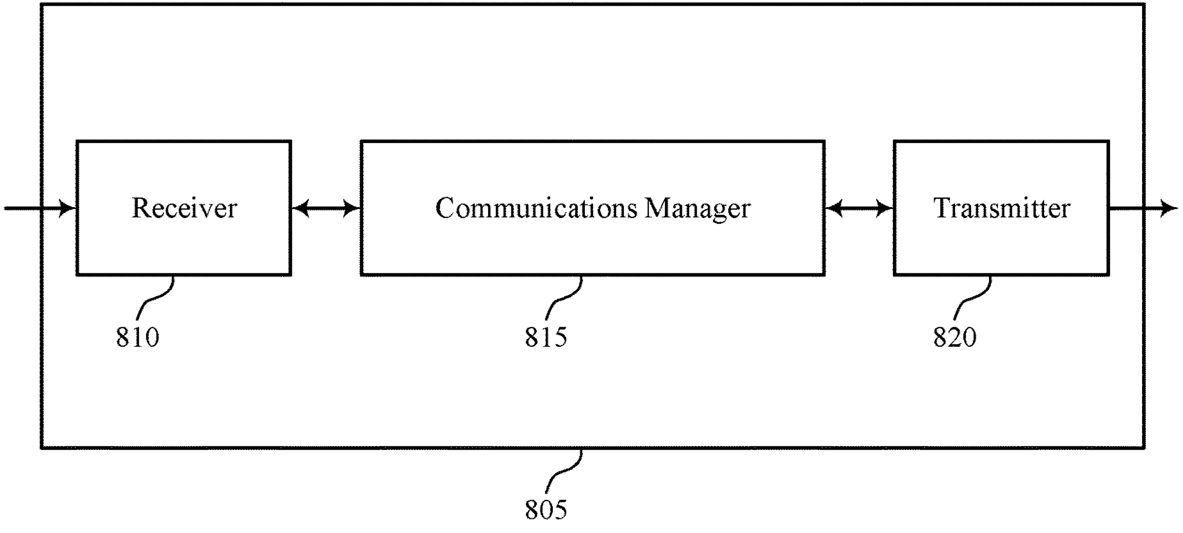
FIGS. 8 and 9 show block diagrams of devices that support techniques for serving cell activation and deactivation using reference signals in accordance with aspects of the present disclosure.

FIG. 8 shows a block diagram 800 of a device 805 that supports techniques for serving cell activation and deactivation using reference signals in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for serving cell activation and deactivation using reference signals, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, while the UE is in wireless communications with a first serving cell supported by a base station, an indication to activate or deactivate a second serving cell supported by the base station, receive a reference signal from the base station via the first serving cell, the reference signal received a duration of time after receipt of the indication, where the duration of time is an interruption period for the wireless communications with the first serving cell, and resume the wireless communications with the first serving cell based on the interruption period ending at receipt of the reference signal. The communications manager 815 may be an example of aspects of the communications manager 1110 described herein.

By including or configuring the communications manager 815 in accordance with examples as described herein, the device 805 may support improved techniques for serving cell activation and deactivation. For example, by receiving a reference signal on a serving cell 205 which is to remain activated (e.g., serving cell 205-*a* illustrated in FIG. 2, serving cell 205-*c* illustrated in FIG. 7), techniques described herein may reduce a duration of an interruption period on the serving cells 205 which are to remain active which is attributable to the activation or deactivation of other serving cells 205 (e.g., serving cell 205-*b* illustrated in FIG. 2, serving cell 205-*d* illustrated in FIG. 7). By reducing a duration of interruption periods on serving cells 205 which are to remain active, techniques described herein may improve the efficiency and reliability of wireless communications, restore service in a more timely manner, and improve user experience.

Based on receiving temporary reference signals on serving cells 205 which are to remain active, a processor of the UE 115 (e.g., a processor controlling the receiver 810, the communications manager 815, the transmitter 820, etc.) may reduce processing resources used cell reselection procedures and/or cell attachment procedures. For example, by enabling the UE 115 to resume wireless communications with the serving cell 205 based on a reception of a reference signal, techniques described herein may reduce a duration of time in which the UE 115 spends out of service in the interruption period, which may reduce power consumption and signaling which is associated with monitoring for SSB messages from the serving cell. By reducing the power consumption, battery life of the UE 115 may be improved. Moreover, by reducing a duration of time in which the UE 115 spends in the interruption period, service may be quickly reestablished at the UE 115, leading to improved user experience.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
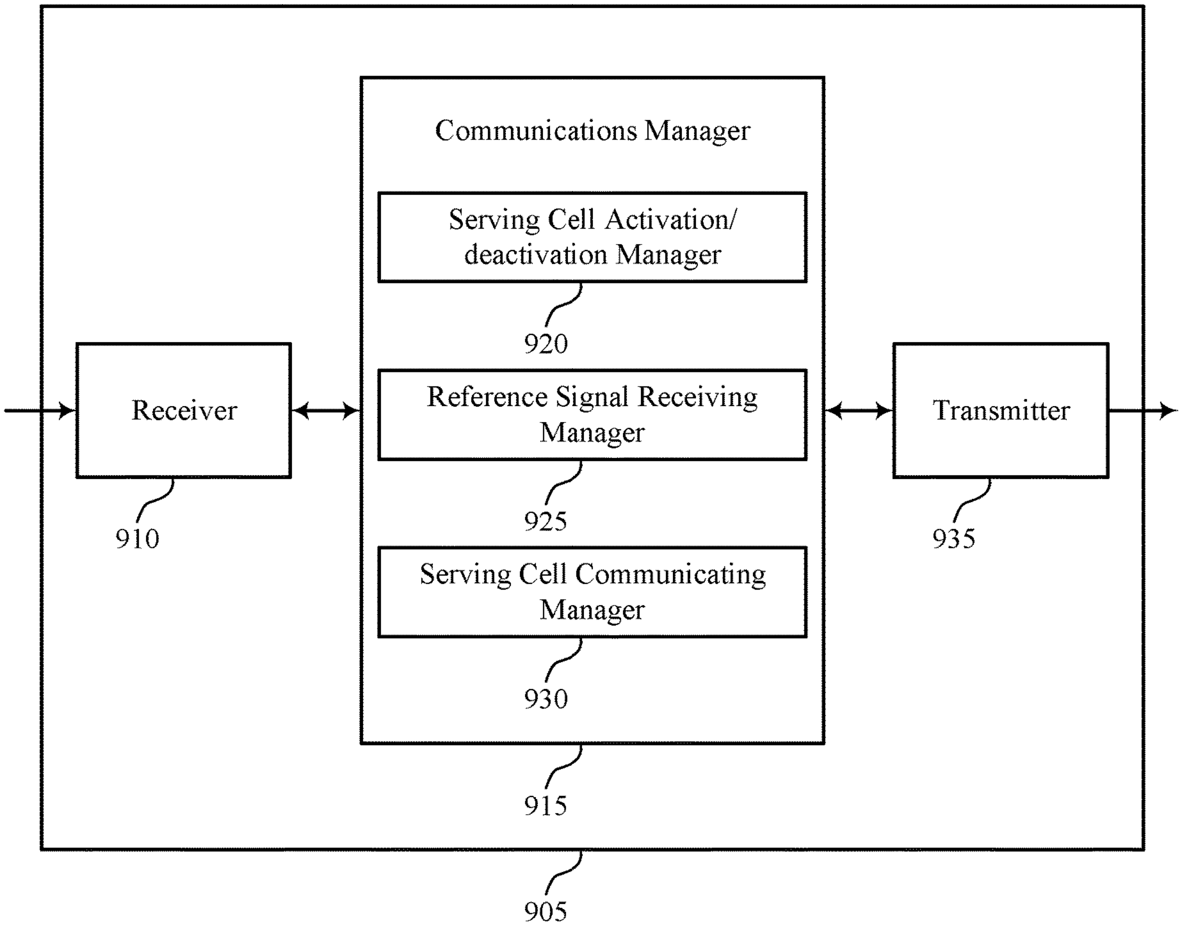

FIG. 9 shows a block diagram 900 of a device 905 that supports techniques for serving cell activation and deactivation using reference signals in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for serving cell activation and deactivation using reference signals, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a serving cell activation/deactivation manager 920, a reference signal receiving manager 925, and a serving cell communicating manager 930. The communications manager 915 may be an example of aspects of the communications manager 1110 described herein.

The serving cell activation/deactivation manager 920 may receive, while the UE is in wireless communications with a first serving cell supported by a base station, an indication to activate or deactivate a second serving cell supported by the base station.

The reference signal receiving manager 925 may receive a reference signal from the base station via the first serving cell, the reference signal received a duration of time after receipt of the indication, where the duration of time is an interruption period for the wireless communications with the first serving cell.

The serving cell communicating manager 930 may resume the wireless communications with the first serving cell based on the interruption period ending at receipt of the reference signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
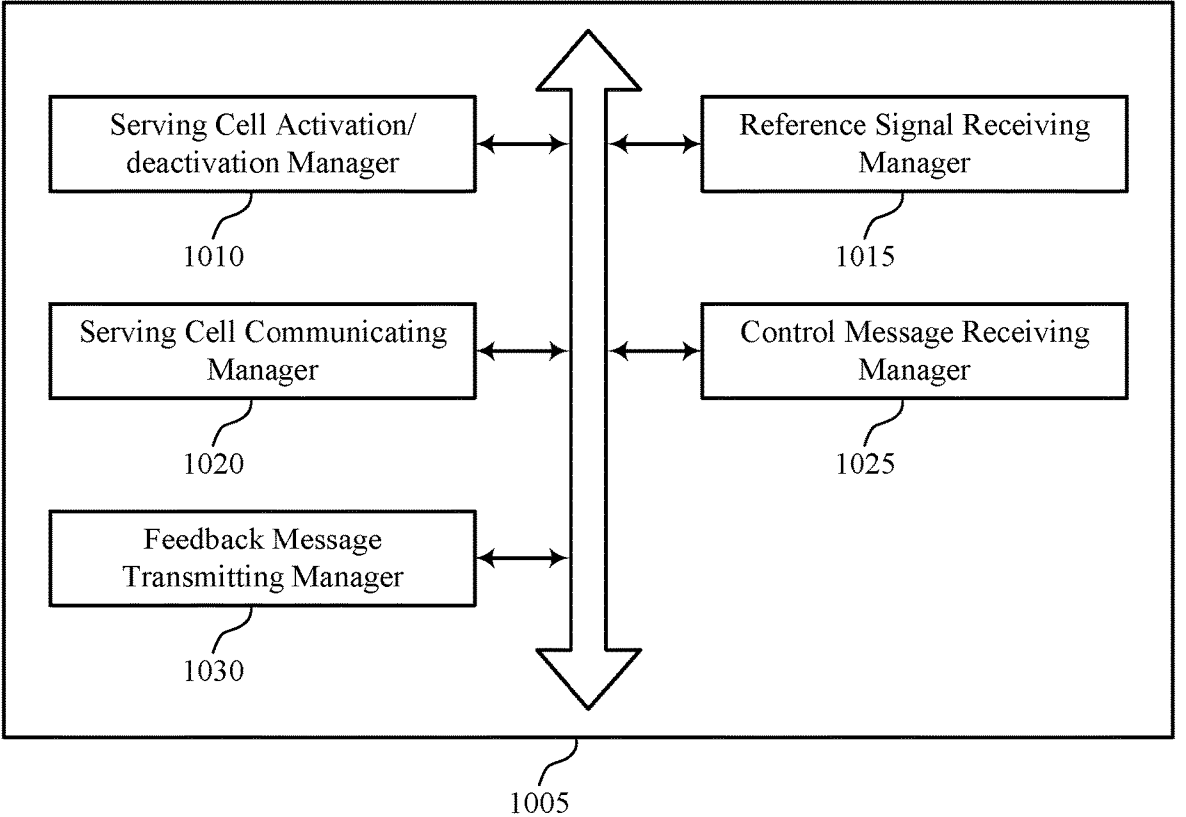
FIG. 10 shows a block diagram of a communications manager that supports techniques for serving cell activation and deactivation using reference signals in accordance with aspects of the present disclosure.

FIG. 10 shows a block diagram 1000 of a communications manager 1005 that supports techniques for serving cell activation and deactivation using reference signals in accordance with aspects of the present disclosure. The communications manager 1005 may be an example of aspects of a communications manager 815, a communications manager 915, or a communications manager 1110 described herein. The communications manager 1005 may include a serving cell activation/deactivation manager 1010, a reference signal receiving manager 1015, a serving cell communicating manager 1020, a control message receiving manager 1025, and a feedback message transmitting manager 1030. Each of these modules may communicate, directly or indirectly, with one another (e.g., via one or more buses).

The serving cell activation/deactivation manager 1010 may receive, while the UE is in wireless communications with a first serving cell supported by a base station, an indication to activate or deactivate a second serving cell supported by the base station.

The reference signal receiving manager 1015 may receive a reference signal from the base station via the first serving cell, the reference signal received a duration of time after receipt of the indication, where the duration of time is an interruption period for the wireless communications with the first serving cell. In some examples, the reference signal receiving manager 1015 may determine that reference signals associated with the first serving cell have been activated based on receiving the indication to activate or deactivate the second serving cell, where receiving the reference signal is based on determining that the reference signals have been activated. In some examples, the reference signal receiving manager 1015 may determine, based on receiving the MAC-CE message, an indication that reference signals associated with the first serving cell have been activated, where receiving the reference signal is based on determining that the reference signals have been activated.

In some examples, the reference signal receiving manager 1015 may receive an additional reference signal from the base station via the second serving cell based on receiving the indication to activate the second serving cell. In some examples, the reference signal receiving manager 1015 may determine, during the interruption period and based on receiving the reference signal, AGC associated with the first serving cell, tracking associated with the first serving cell, or both. In some cases, the reference signal, the additional reference signal, or both, include a temporary reference signal. In some cases, the temporary reference signal is a tracking reference signal or a non-zero power channel state information reference signal configured as a tracking reference signal. In some cases, the reference signal received via the first serving cell and the additional reference signal received via the second serving cell are received using a common set of time resources. In some cases, the reference signal received via the first serving cell and the additional reference signal received via the second serving cell are received using a common sub-carrier spacing.

The serving cell communicating manager 1020 may resume the wireless communications with the first serving cell based on the interruption period ending at receipt of the reference signal. In some examples, the serving cell communicating manager 1020 may establish wireless communications with the base station via the second serving cell based on receiving the additional reference signal. In some examples, the serving cell communicating manager 1020 may determine that the second serving cell has been deactivated based on transmitting the feedback message. In some examples, the serving cell communicating manager 1020 may both the first serving cell and the second serving cell each include SCells. In some examples, the first serving cell and the second serving cell are in the same frequency band. In some cases, the first serving cell is a PSCell of an SCG, and the second serving cell is an SCell of the SCG.

In some cases, the first serving cell includes a primary cell, and the second serving cell includes an SCell. In some cases, the first serving cell is associated with a first radio access technology, and the second serving cell is associated with a second radio access technology different from the first radio access technology. In some cases, each of the first radio access technology and the second radio access technology include one of an NR access technology, a 5G radio access technology, an LTE radio access technology, or a 4G radio access technology. In some cases, the first serving cell is associated with a first frequency band of a first radio access technology, and the second serving cell is associated with a second frequency band of the first radio access technology.

The control message receiving manager 1025 may receive, from the base station, a control message including an indication of a set of resources usable by the UE to receive the reference signal, where receiving the reference signal is based on the control message. In some examples, the control message receiving manager 1025 may receive, from the base station via the first serving cell, a downlink control message scheduling a downlink transmission from the base station to the UE, where receiving the indication to activate or deactivate the second serving cell is based on the downlink control message. In some examples, the control message receiving manager 1025 may receive, via the downlink control message, an indication that reference signals associated with the first serving cell have been activated, where receiving the reference signal is based on receiving the indication that the reference signals have been activated. In some examples, the control message receiving manager 1025 may receive, from the base station, an indication that reference signals associated with both the first serving cell and the second serving cell have been activated, where receiving the reference signal via the first serving cell, receiving the additional reference signal via the second serving cell, or both, is based on receiving the indication that the reference signals have been activated.

The feedback message transmitting manager 1030 may transmit a feedback message to the base station based on receiving the indication to activate or deactivate the second serving cell, where the interruption period begins based on transmitting the feedback message. In some examples, the feedback message transmitting manager 1030 may transmit, to the base station, a feedback message based on receiving the indication to deactivate the second serving cell.

Figure 11:
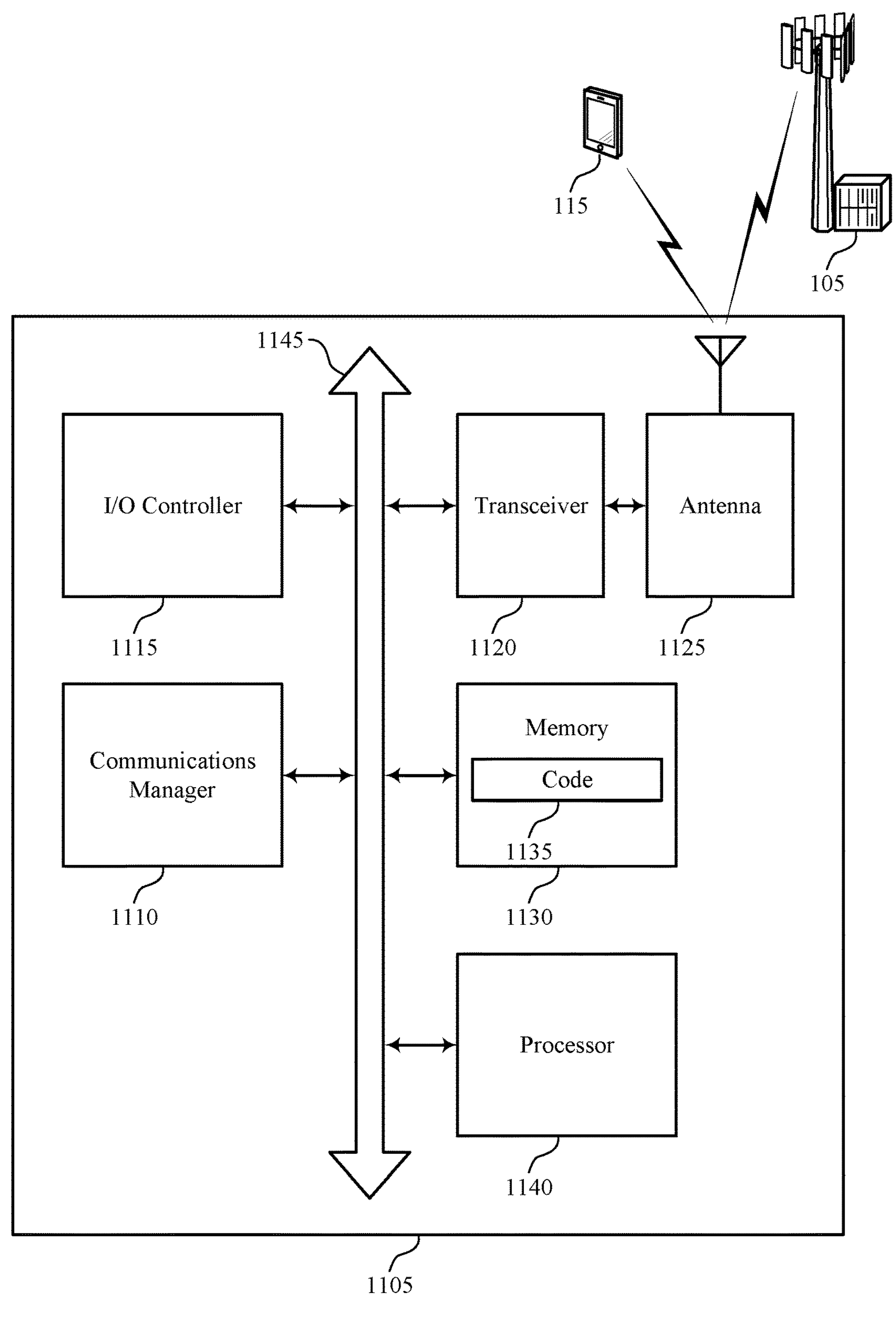
FIG. 11 shows a diagram of a system including a device that supports techniques for serving cell activation and deactivation using reference signals in accordance with aspects of the present disclosure.

FIG. 11 shows a diagram of a system 1100 including a device 1105 that supports techniques for serving cell activation and deactivation using reference signals in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, while the UE is in wireless communications with a first serving cell supported by a base station, an indication to activate or deactivate a second serving cell supported by the base station, receive a reference signal from the base station via the first serving cell, the reference signal received a duration of time after receipt of the indication, where the duration of time is an interruption period for the wireless communications with the first serving cell, and resume the wireless communications with the first serving cell based on the interruption period ending at receipt of the reference signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for serving cell activation and deactivation using reference signals).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
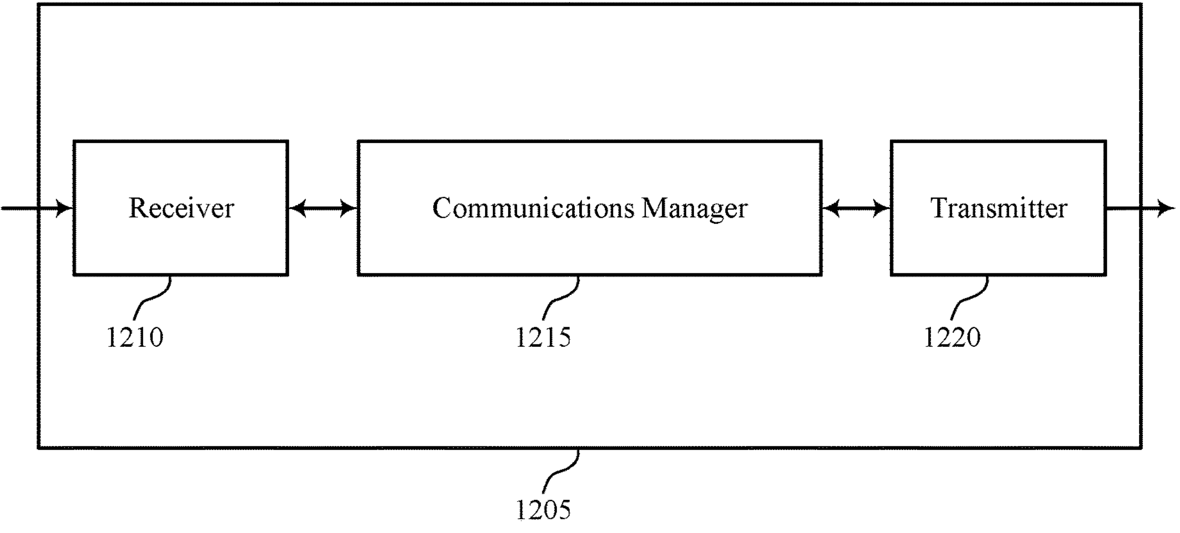
FIGS. 12 and 13 show block diagrams of devices that support techniques for serving cell activation and deactivation using reference signals in accordance with aspects of the present disclosure.

FIG. 12 shows a block diagram 1200 of a device 1205 that supports techniques for serving cell activation and deactivation using reference signals in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for serving cell activation and deactivation using reference signals, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE while the base station is in wireless communications with the UE via a first serving cell supported by the base station, an indication to activate or deactivate a second serving cell supported by the base station, transmit a reference signal to the UE via the first serving cell, the reference signal transmitted a duration of time after transmission of the indication, where the duration of time is an interruption period for the wireless communications with the first serving cell, and resume the wireless communications with the UE via the first serving cell based on the interruption period ending at receipt of the reference signal. The communications manager 1215 may be an example of aspects of the communications manager 1510 described herein.

By including or configuring the communication manager 1215 in accordance with examples as described herein, the device 1505 may support improved techniques for serving cell activation and deactivation. For example, by transmitting a reference signal on a serving cell 205 which is to remain activated (e.g., serving cell 205-*a* illustrated in FIG. 2, serving cell 205-*c* illustrated in FIG. 7), techniques described herein may reduce a duration of an interruption period on the serving cells 205 which are to remain active which is attributable to the activation or deactivation of other serving cells 205 (e.g., serving cell 205-*b* illustrated in FIG. 2, serving cell 205-*d* illustrated in FIG. 7). By reducing a duration of interruption periods on serving cells 205 which are to remain active, techniques described herein may improve the efficiency and reliability of wireless communications, restore service in a more timely manner, and improve user experience.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
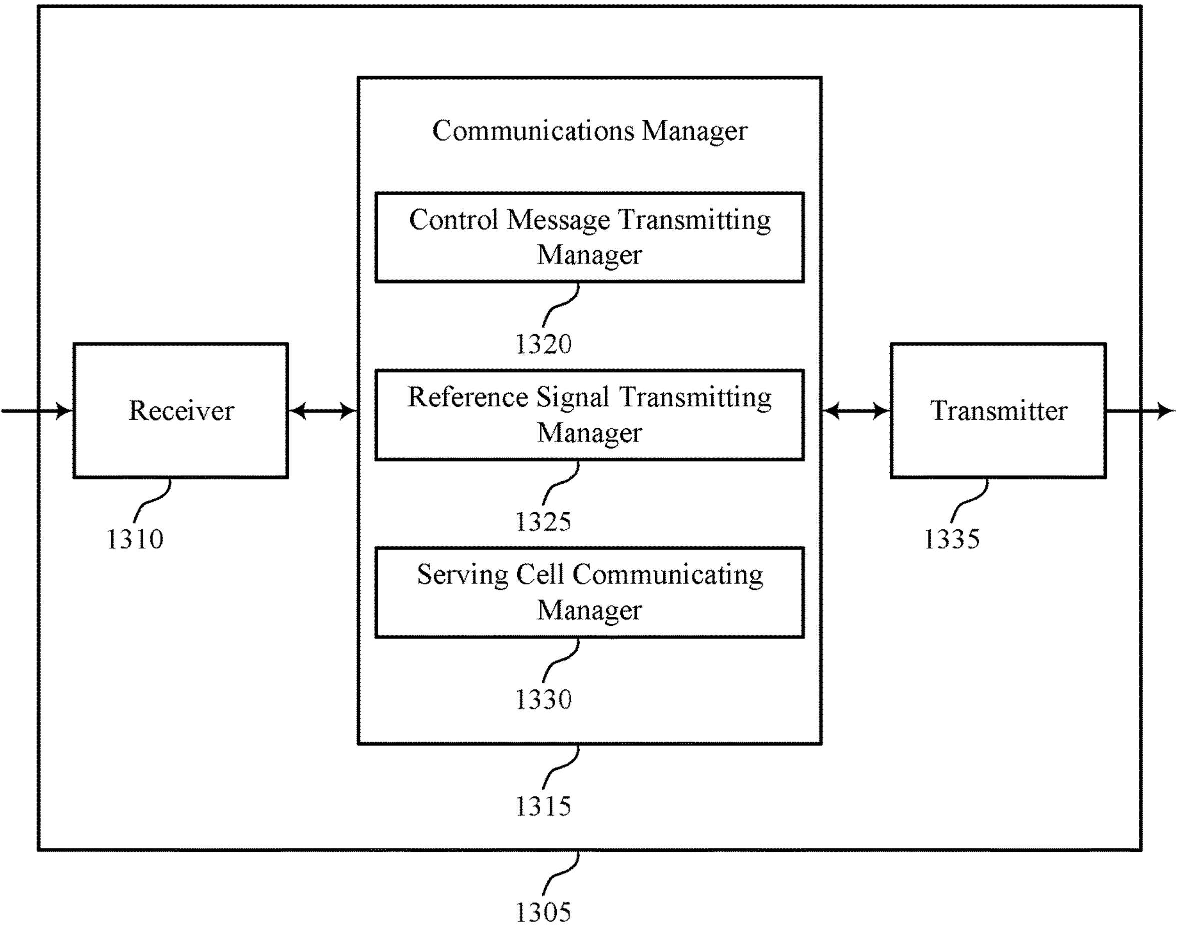

FIG. 13 shows a block diagram 1300 of a device 1305 that supports techniques for serving cell activation and deactivation using reference signals in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for serving cell activation and deactivation using reference signals, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a control message transmitting manager 1320, a reference signal transmitting manager 1325, and a serving cell communicating manager 1330. The communications manager 1315 may be an example of aspects of the communications manager 1510 described herein.

The control message transmitting manager 1320 may transmit, to a UE while the base station is in wireless communications with the UE via a first serving cell supported by the base station, an indication to activate or deactivate a second serving cell supported by the base station.

The reference signal transmitting manager 1325 may transmit a reference signal to the UE via the first serving cell, the reference signal transmitted a duration of time after transmission of the indication, where the duration of time is an interruption period for the wireless communications with the first serving cell.

The serving cell communicating manager 1330 may resume the wireless communications with the UE via the first serving cell based on the interruption period ending at receipt of the reference signal.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
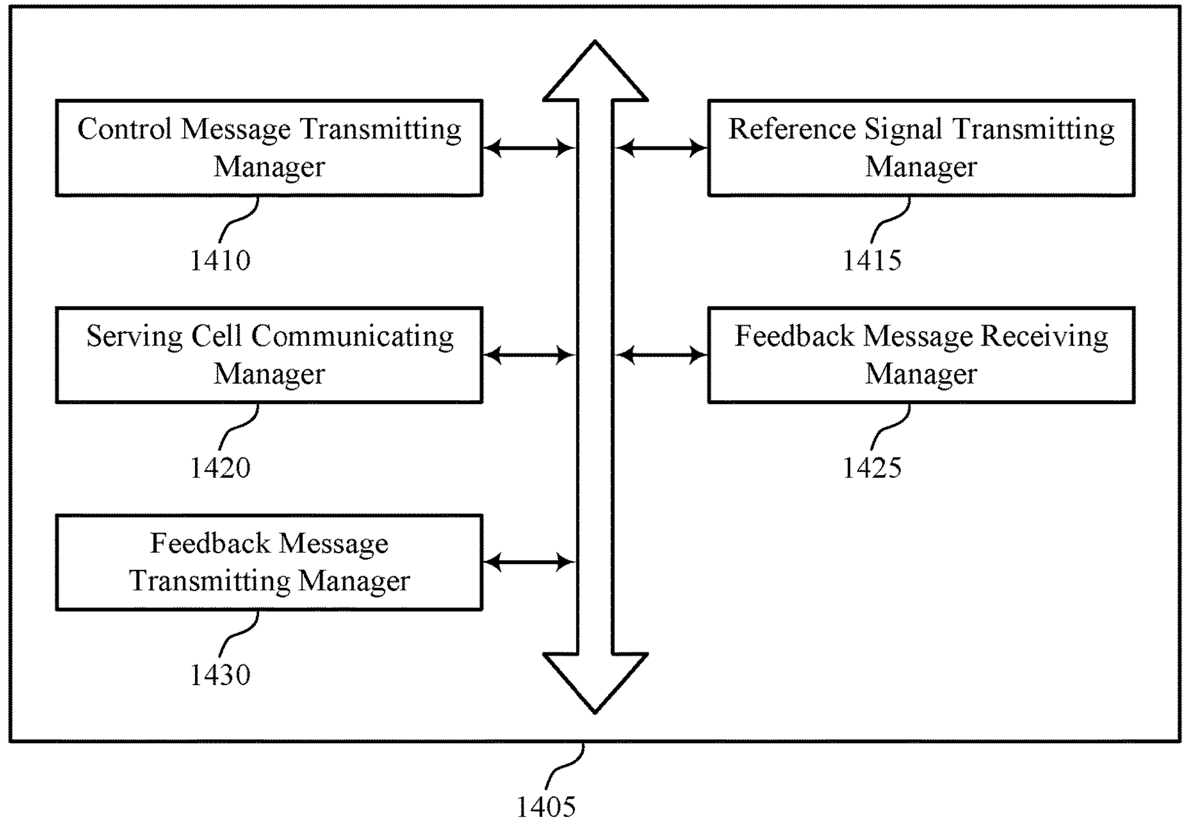
FIG. 14 shows a block diagram of a communications manager that supports techniques for serving cell activation and deactivation using reference signals in accordance with aspects of the present disclosure.

FIG. 14 shows a block diagram 1400 of a communications manager 1405 that supports techniques for serving cell activation and deactivation using reference signals in accordance with aspects of the present disclosure. The communications manager 1405 may be an example of aspects of a communications manager 1215, a communications manager 1315, or a communications manager 1510 described herein. The communications manager 1405 may include a control message transmitting manager 1410, a reference signal transmitting manager 1415, a serving cell communicating manager 1420, a feedback message receiving manager 1425, and a feedback message transmitting manager 1430. Each of these modules may communicate, directly or indirectly, with one another (e.g., via one or more buses).

The control message transmitting manager 1410 may transmit, to a UE while the base station is in wireless communications with the UE via a first serving cell supported by the base station, an indication to activate or deactivate a second serving cell supported by the base station. In some examples, the control message transmitting manager 1410 may transmit, to the UE, a control message including an indication of a set of resources usable by the UE to receive the reference signal, where transmitting the reference signal is based on the control message. In some examples, the control message transmitting manager 1410 may transmit, to the UE via the first serving cell, a downlink control message scheduling a downlink transmission from the base station to the UE, where transmitting the indication to activate or deactivate the second serving cell is based on the downlink control message. In some examples, the control message transmitting manager 1410 may transmit, via the downlink control message, an indication that reference signals associated with the first serving cell have been activated, where transmitting the reference signal is based on transmitting the indication that the reference signals have been activated. In some examples, the control message transmitting manager 1410 may transmit, to the UE, an indication that reference signals associated with both the first serving cell and the second serving cell have been activated, where transmitting the reference signal via the first serving cell, transmitting the additional reference signal via the second serving cell, or both, is based on transmitting the indication that the reference signals have been activated.

In some cases, the indication to activate or deactivate the second serving cell is transmitted to the UE via a MAC-CE message.

The reference signal transmitting manager 1415 may transmit a reference signal to the UE via the first serving cell, the reference signal transmitted a duration of time after transmission of the indication, where the duration of time is an interruption period for the wireless communications with the first serving cell. In some examples, the reference signal transmitting manager 1415 may transmit an additional reference signal to the UE via the second serving cell based on transmitting the indication to activate the second serving cell. In some cases, the reference signal, the additional reference signal, or both, include a temporary reference signal. In some cases, the temporary reference signal is a tracking reference signal or a non-zero power channel state information reference signal configured as a tracking reference signal. In some cases, the reference signal transmitted via the first serving cell and the additional reference signal transmitted via the second serving cell are transmitted using a common set of time resources. In some cases, the reference signal transmitted via the first serving cell and the additional reference signal transmitted via the second serving cell are transmitted using a common sub-carrier spacing. In some cases, the reference signal includes an indication of AGC associated with the first serving cell, an indication of tracking (e.g., time/frequency tracking) associated with the first serving cell, or both.

The serving cell communicating manager 1420 may resume the wireless communications with the UE via the first serving cell based on the interruption period ending at receipt of the reference signal. In some examples, the serving cell communicating manager 1420 may establish wireless communications with the UE via the second serving cell based on transmitting the additional reference signal. In some examples, the serving cell communicating manager 1420 may determine that the second serving cell has been deactivated based on receiving the feedback message. In some examples, the serving cell communicating manager 1420 may both the first serving cell and the second serving cell each include SCells. In some examples, the serving cell communicating manager 1420 may first serving cell and the second serving cell are in the same frequency band. In some cases, the first serving cell is a PSCell of an SCG, and the second serving cell is an SCell of the SCG.

In some cases, the first serving cell includes a primary cell, and the second serving cell includes an SCell. In some cases, the first serving cell is associated with a first radio access technology, and the second serving cell is associated with a second radio access technology different from the first radio access technology. In some cases, each of the first radio access technology and the second radio access technology include one of an NR access technology, a 5G radio access technology, an LTE radio access technology, or a 4G radio access technology. In some cases, the first serving cell is associated with a first frequency band of a first radio access technology, and the second serving cell is associated with a second frequency band of the first radio access technology.

The feedback message receiving manager 1425 may receive, from the UE, a feedback message based on transmitting the indication to activate or deactivate the second serving cell, where the interruption period begins based on the feedback message.

The feedback message transmitting manager 1430 may receive, from the UE, a feedback message based on transmitting the indication to deactivate the second serving cell.

Figure 15:
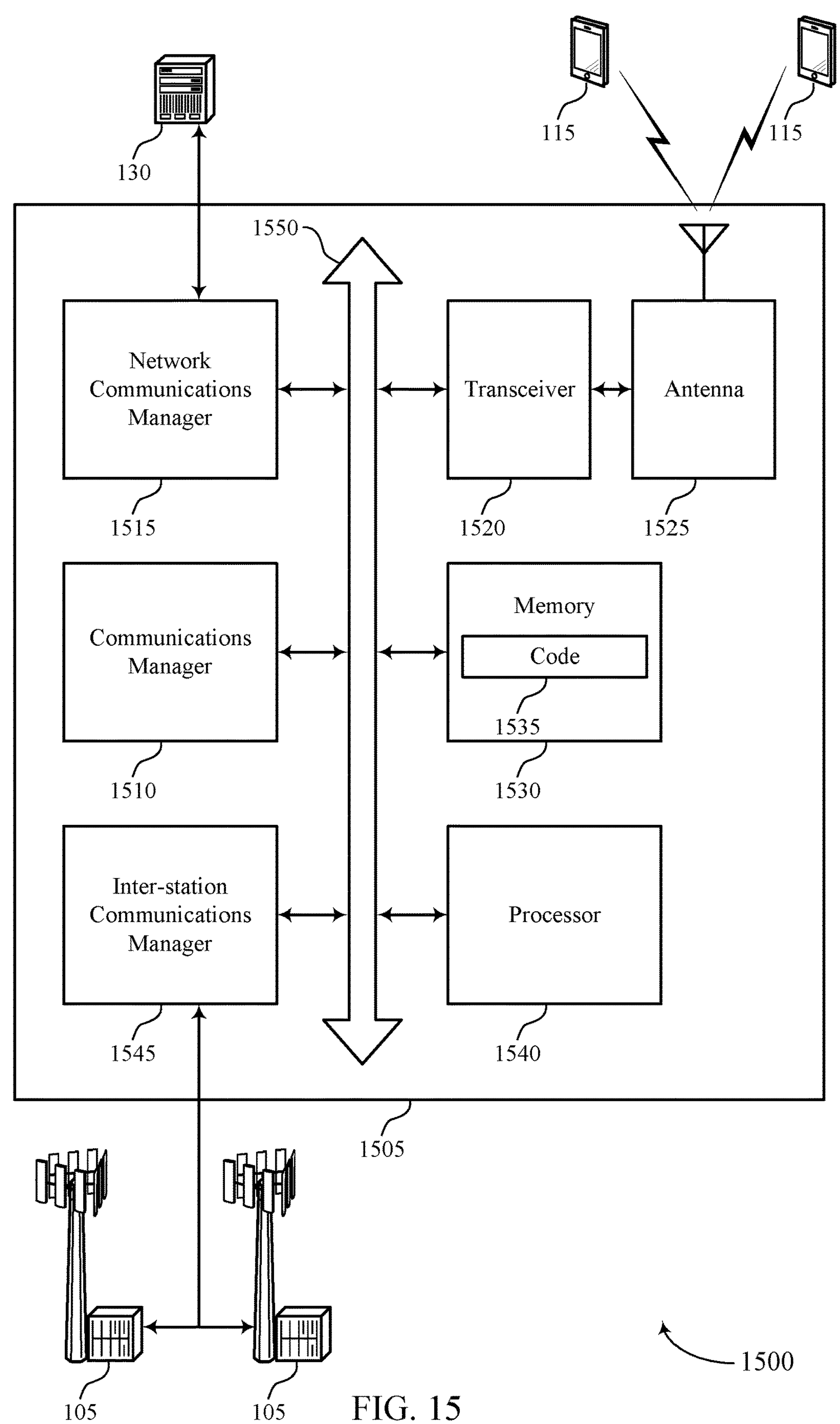
FIG. 15 shows a diagram of a system including a device that supports techniques for serving cell activation and deactivation using reference signals in accordance with aspects of the present disclosure.

FIG. 15 shows a diagram of a system 1500 including a device 1505 that supports techniques for serving cell activation and deactivation using reference signals in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE while the base station is in wireless communications with the UE via a first serving cell supported by the base station, an indication to activate or deactivate a second serving cell supported by the base station, transmit a reference signal to the UE via the first serving cell, the reference signal transmitted a duration of time after transmission of the indication, where the duration of time is an interruption period for the wireless communications with the first serving cell, and resume the wireless communications with the UE via the first serving cell based on the interruption period ending at receipt of the reference signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for serving cell activation and deactivation using reference signals).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
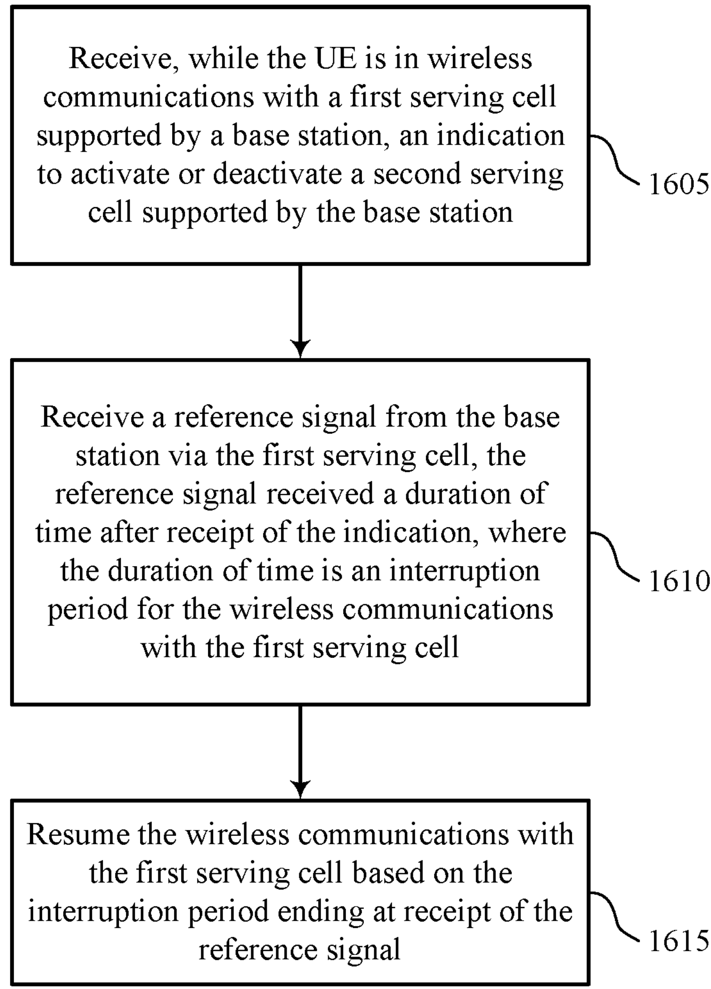
FIGS. 16 through 19 show flowcharts illustrating methods that support techniques for serving cell activation and deactivation using reference signals in accordance with aspects of the present disclosure.

FIG. 16 shows a flowchart illustrating a method 1600 that supports techniques for serving cell activation and deactivation using reference signals in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, while the UE is in wireless communications with a first serving cell supported by a base station, an indication to activate or deactivate a second serving cell supported by the base station. The operations of 1605 may be performed according to the methods described herein. In some examples, aspects of the operations of 1605 may be performed by a serving cell activation/deactivation manager as described with reference to FIGS. 8 through 11.

At 1610, the UE may receive a reference signal from the base station via the first serving cell, the reference signal received a duration of time after receipt of the indication, where the duration of time is an interruption period for the wireless communications with the first serving cell. The operations of 1610 may be performed according to the methods described herein. In some examples, aspects of the operations of 1610 may be performed by a reference signal receiving manager as described with reference to FIGS. 8 through 11.

At 1615, the UE may resume the wireless communications with the first serving cell based on the interruption period ending at receipt of the reference signal. The operations of 1615 may be performed according to the methods described herein. In some examples, aspects of the operations of 1615 may be performed by a serving cell communicating manager as described with reference to FIGS. 8 through 11.

Figure 17:
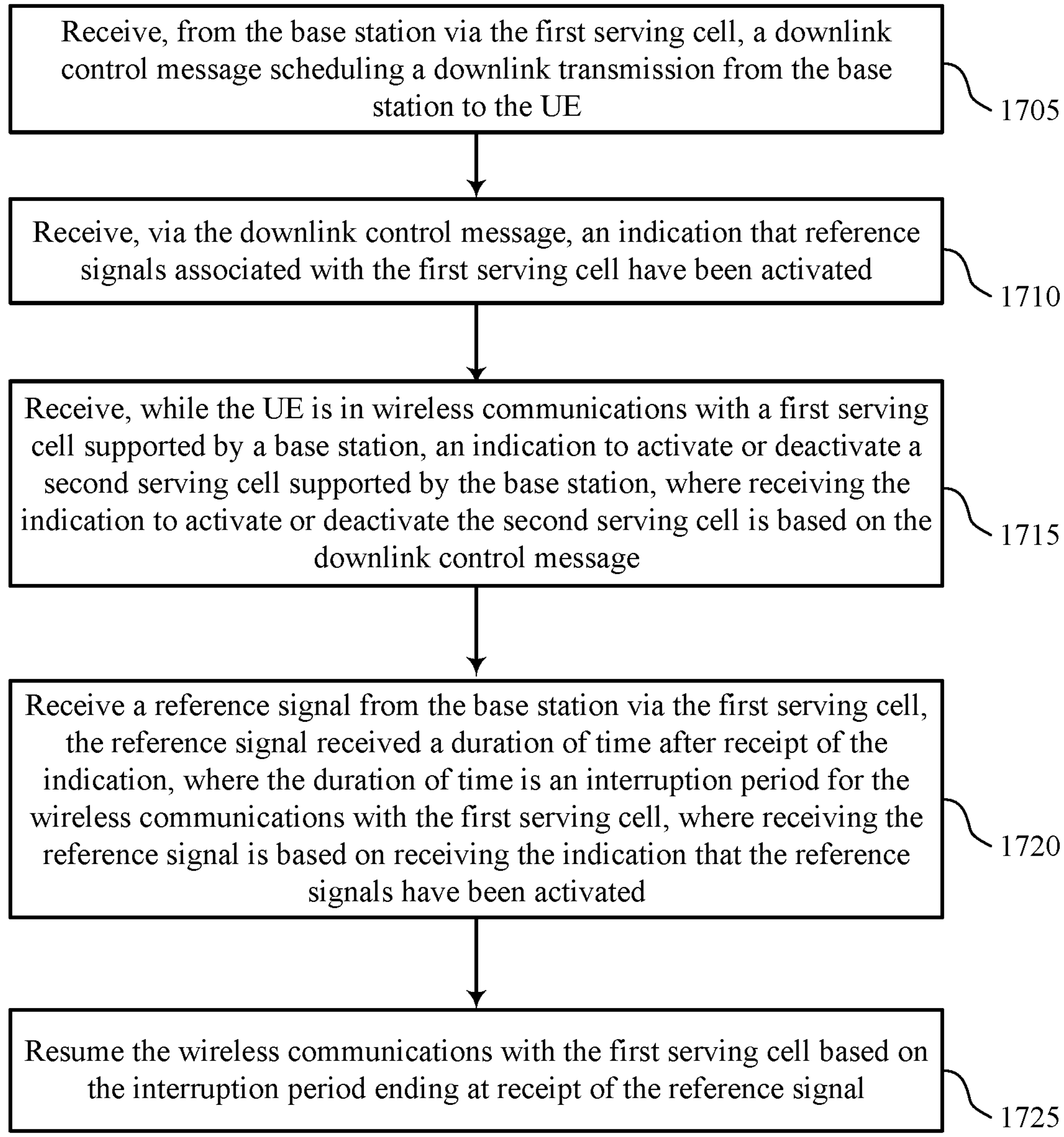

FIG. 17 shows a flowchart illustrating a method 1700 that supports techniques for serving cell activation and deactivation using reference signals in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from the base station via the first serving cell, a downlink control message scheduling a downlink transmission from the base station to the UE. The operations of 1705 may be performed according to the methods described herein. In some examples, aspects of the operations of 1705 may be performed by a control message receiving manager as described with reference to FIGS. 8 through 11.

At 1710, the UE may receive, via the downlink control message, an indication that reference signals associated with the first serving cell have been activated. The operations of 1710 may be performed according to the methods described herein. In some examples, aspects of the operations of 1710 may be performed by a control message receiving manager as described with reference to FIGS. 8 through 11.

At 1715, the UE may receive, while the UE is in wireless communications with a first serving cell supported by a base station, an indication to activate or deactivate a second serving cell supported by the base station, where receiving the indication to activate or deactivate the second serving cell is based on the downlink control message. The operations of 1715 may be performed according to the methods described herein. In some examples, aspects of the operations of 1715 may be performed by a serving cell activation/deactivation manager as described with reference to FIGS. 8 through 11.

At 1720, the UE may receive a reference signal from the base station via the first serving cell, the reference signal received a duration of time after receipt of the indication, where the duration of time is an interruption period for the wireless communications with the first serving cell, where receiving the reference signal is based on receiving the indication that the reference signals have been activated. The operations of 1720 may be performed according to the methods described herein. In some examples, aspects of the operations of 1720 may be performed by a reference signal receiving manager as described with reference to FIGS. 8 through 11.

At 1725, the UE may resume the wireless communications with the first serving cell based on the interruption period ending at receipt of the reference signal. The operations of 1725 may be performed according to the methods described herein. In some examples, aspects of the operations of 1725 may be performed by a serving cell communicating manager as described with reference to FIGS. 8 through 11.

Figure 18:
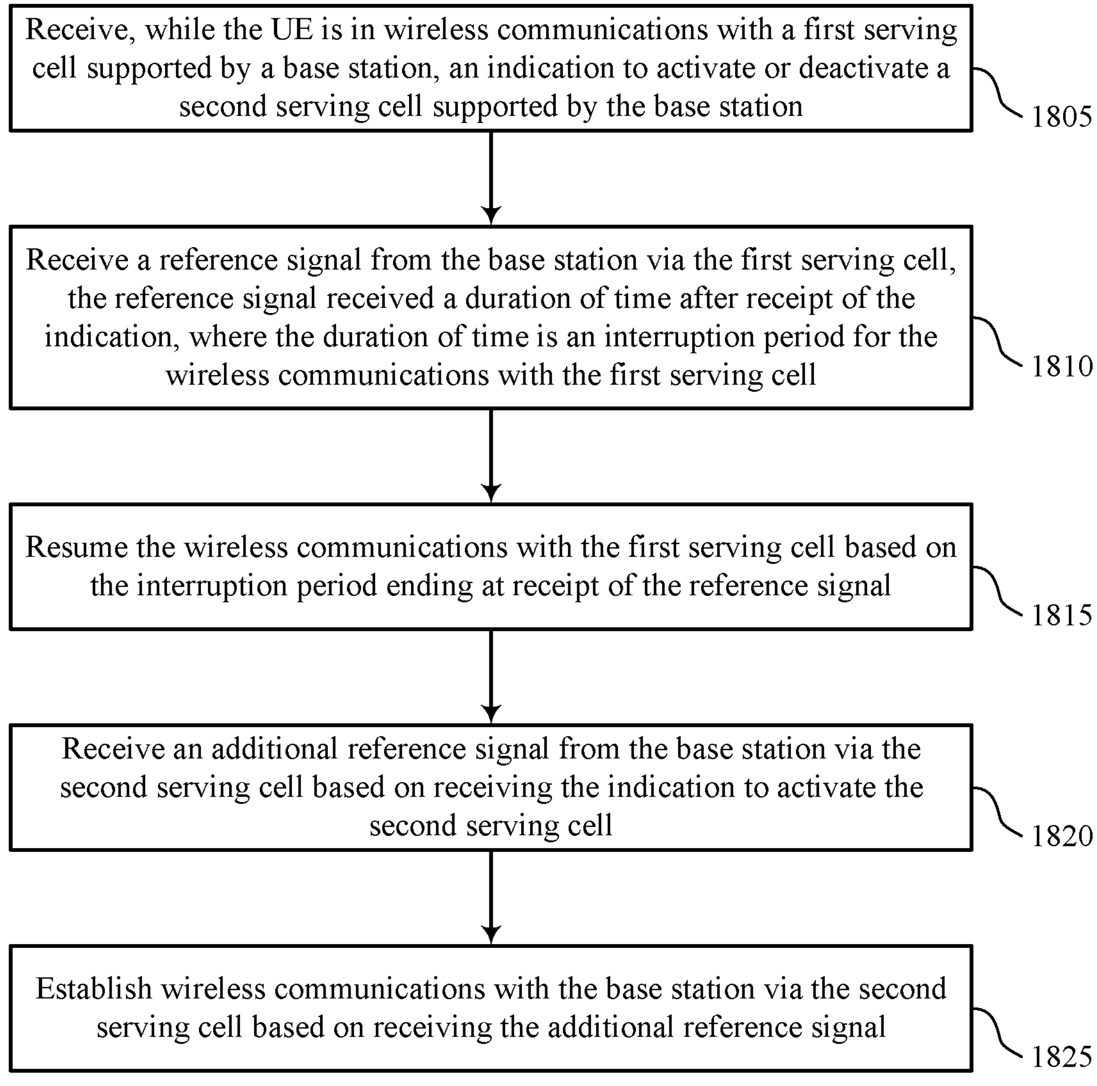

FIG. 18 shows a flowchart illustrating a method 1800 that supports techniques for serving cell activation and deactivation using reference signals in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, while the UE is in wireless communications with a first serving cell supported by a base station, an indication to activate or deactivate a second serving cell supported by the base station. The operations of 1805 may be performed according to the methods described herein. In some examples, aspects of the operations of 1805 may be performed by a serving cell activation/deactivation manager as described with reference to FIGS. 8 through 11.

At 1810, the UE may receive a reference signal from the base station via the first serving cell, the reference signal received a duration of time after receipt of the indication, where the duration of time is an interruption period for the wireless communications with the first serving cell. The operations of 1810 may be performed according to the methods described herein. In some examples, aspects of the operations of 1810 may be performed by a reference signal receiving manager as described with reference to FIGS. 8 through 11.

At 1815, the UE may resume the wireless communications with the first serving cell based on the interruption period ending at receipt of the reference signal. The operations of 1815 may be performed according to the methods described herein. In some examples, aspects of the operations of 1815 may be performed by a serving cell communicating manager as described with reference to FIGS. 8 through 11.

At 1820, the UE may receive an additional reference signal from the base station via the second serving cell based on receiving the indication to activate the second serving cell. The operations of 1820 may be performed according to the methods described herein. In some examples, aspects of the operations of 1820 may be performed by a reference signal receiving manager as described with reference to FIGS. 8 through 11.

At 1825, the UE may establish wireless communications with the base station via the second serving cell based on receiving the additional reference signal. The operations of 1825 may be performed according to the methods described herein. In some examples, aspects of the operations of 1825 may be performed by a serving cell communicating manager as described with reference to FIGS. 8 through 11.

Figure 19:
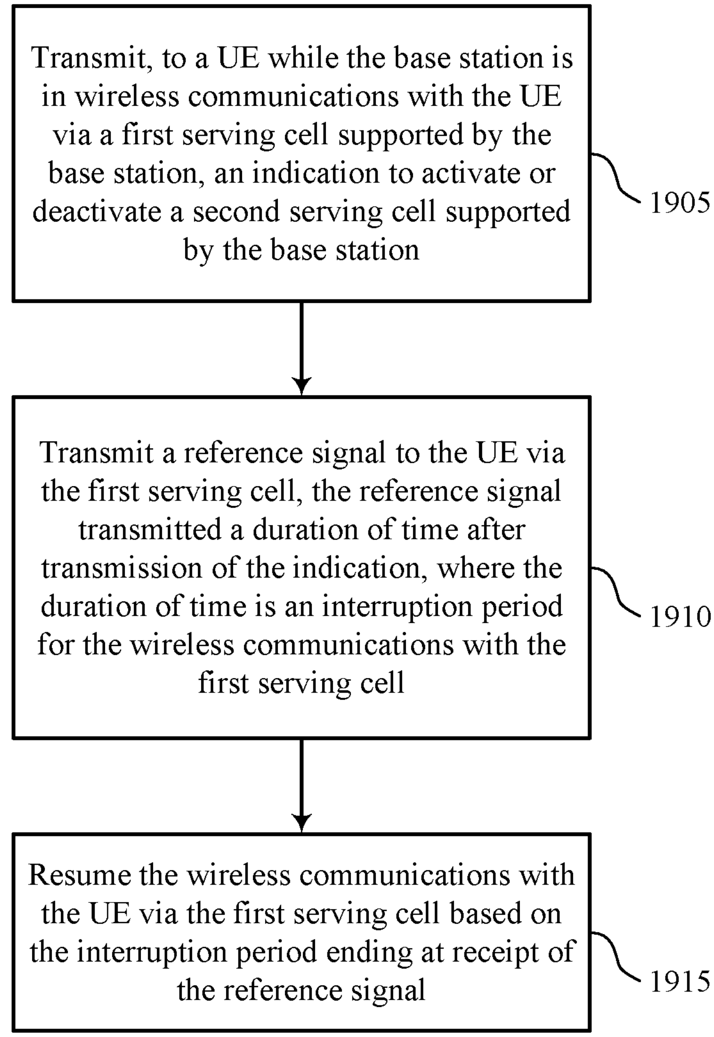

FIG. 19 shows a flowchart illustrating a method 1900 that supports techniques for serving cell activation and deactivation using reference signals in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE while the base station is in wireless communications with the UE via a first serving cell supported by the base station, an indication to activate or deactivate a second serving cell supported by the base station. The operations of 1905 may be performed according to the methods described herein. In some examples, aspects of the operations of 1905 may be performed by a control message transmitting manager as described with reference to FIGS. 12 through 15.

At 1910, the base station may transmit a reference signal to the UE via the first serving cell, the reference signal transmitted a duration of time after transmission of the indication, where the duration of time is an interruption period for the wireless communications with the first serving cell. The operations of 1910 may be performed according to the methods described herein. In some examples, aspects of the operations of 1910 may be performed by a reference signal transmitting manager as described with reference to FIGS. 12 through 15.

At 1915, the base station may resume the wireless communications with the UE via the first serving cell based on the interruption period ending at receipt of the reference signal. The operations of 1915 may be performed according to the methods described herein. In some examples, aspects of the operations of 1915 may be performed by a serving cell communicating manager as described with reference to FIGS. 12 through 15.

The following provides an overview of aspects of the present disclosure:

Aspect 1: A method for wireless communication at a UE, comprising: receiving, while the UE is in wireless communications with a first serving cell supported by a base station, an indication to activate or deactivate a second serving cell supported by the base station; receiving a reference signal from the base station via the first serving cell, the reference signal received a duration of time after receipt of the indication, wherein the duration of time is an interruption period for the wireless communications with the first serving cell; and resuming the wireless communications with the first serving cell based at least in part on the interruption period ending at receipt of the reference signal.

Aspect 2: The method of aspect 1, further comprising: receiving, from the base station, a control message comprising an indication of a set of resources usable by the UE to receive the reference signal, wherein receiving the reference signal is based at least in part on the control message.

Aspect 3: The method of any of aspects 1 through 2, further comprising: receiving, from the base station via the first serving cell, a downlink control message scheduling a downlink transmission from the base station to the UE, wherein receiving the indication to activate or deactivate the second serving cell is based at least in part on the downlink control message.

Aspect 4: The method of aspect 3, further comprising: receiving, via the downlink control message, an indication that reference signals associated with the first serving cell have been activated, wherein receiving the reference signal is based at least in part on receiving the indication that the reference signals have been activated.

Aspect 5: The method of any of aspects 1 through 4, further comprising: determining that reference signals associated with the first serving cell have been activated based at least in part on receiving the indication to activate or deactivate the second serving cell, wherein receiving the reference signal is based at least in part on determining that the reference signals have been activated.

Aspect 6: The method of any of aspects 1 through 5, wherein the indication to activate or deactivate the second serving cell is received from the base station via a MAC-CE message, the method further comprising: determining, based at least in part on receiving the MAC-CE message, an indication that reference signals associated with the first serving cell have been activated, wherein receiving the reference signal is based at least in part on determining that the reference signals have been activated.

Aspect 7: The method of any of aspects 1 through 6, further comprising: transmitting a feedback message to the base station based at least in part on receiving the indication to activate or deactivate the second serving cell, wherein the interruption period begins based at least in part on transmitting the feedback message.

Aspect 8: The method of any of aspects 1 through 7, wherein the indication comprises an activation of the second serving cell supported by the base station, the method further comprising: receiving an additional reference signal from the base station via the second serving cell based at least in part on receiving the indication to activate the second serving cell; and establishing wireless communications with the base station via the second serving cell based at least in part on receiving the additional reference signal.

Aspect 9: The method of aspect 8, wherein the reference signal, the additional reference signal, or both, comprise a temporary reference signal.

Aspect 10: The method of aspect 9, wherein the temporary reference signal is a tracking reference signal or a non-zero power channel state information reference signal configured as the tracking reference signal.

Aspect 11: The method of any of aspects 8 through 10, wherein the reference signal received via the first serving cell and the additional reference signal received via the second serving cell are received using a common set of time resources.

Aspect 12: The method of any of aspects 8 through 10, wherein the reference signal received via the first serving cell and the additional reference signal received via the second serving cell are received using a common sub-carrier spacing.

Aspect 13: The method of any of aspects 8 through 12, further comprising: receiving, from the base station, an indication that reference signals associated with both the first serving cell and the second serving cell have been activated, wherein receiving the reference signal via the first serving cell, receiving the additional reference signal via the second serving cell, or both, is based at least in part on receiving the indication that the reference signals have been activated.

Aspect 14: The method of any of aspects 1 through 13, wherein the indication comprises a deactivation of the second serving cell supported by the base station, the method further comprising: transmitting, to the base station, a feedback message based at least in part on receiving the indication to deactivate the second serving cell; and determining that the second serving cell has been deactivated based at least in part on transmitting the feedback message.

Aspect 15: The method of any of aspects 1 through 14, wherein the first serving cell comprises a primary cell, and the second serving cell comprises a secondary cell.

Aspect 16: The method of any of aspects 1 through 14, wherein both the first serving cell and the second serving cell each comprise secondary cells.

Aspect 17: The method of any of aspects 1 through 16, wherein the first serving cell and the second serving cell are in the same frequency band.

Aspect 18: The method of any of aspects 1 through 17, further comprising: determining, during the interruption period and based at least in part on receiving the reference signal, automatic gain control associated with the first serving cell, tracking associated with the first serving cell, or both.

Aspect 19: The method of any of aspects 1 through 18, wherein the first serving cell is associated with a first radio access technology, and the second serving cell is associated with a second radio access technology different from the first radio access technology.

Aspect 20: The method of aspect 19, wherein each of the first radio access technology and the second radio access technology comprise one of a New Radio (NR) access technology, a Fifth Generation (5G) radio access technology, a Long-Term Evolution (LTE) radio access technology, or a Fourth Generation (4G) radio access technology.

Aspect 21: The method of any of aspects 1 through 20, wherein the first serving cell is associated with a first frequency band of a first radio access technology, and the second serving cell is associated with a second frequency band of the first radio access technology.

Aspect 22: The method of any of aspects 1 through 21, wherein the first serving cell is a primary-secondary cell of a secondary cell group, and the second serving cell is a secondary cell of the secondary cell group.

Aspect 23: A method for wireless communication at a base station, comprising: transmitting, to a UE while the base station is in wireless communications with the UE via a first serving cell supported by the base station, an indication to activate or deactivate a second serving cell supported by the base station; transmitting a reference signal to the UE via the first serving cell, the reference signal transmitted a duration of time after transmission of the indication, wherein the duration of time is an interruption period for the wireless communications with the first serving cell; and resuming the wireless communications with the UE via the first serving cell based at least in part on the interruption period ending at receipt of the reference signal.

Aspect 24: The method of aspect 23, further comprising: transmitting, to the UE, a control message comprising an indication of a set of resources usable by the UE to receive the reference signal, wherein transmitting the reference signal is based at least in part on the control message.

Aspect 25: The method of any of aspects 23 through 24, further comprising: transmitting, to the UE via the first serving cell, a downlink control message scheduling a downlink transmission from the base station to the UE, wherein transmitting the indication to activate or deactivate the second serving cell is based at least in part on the downlink control message.

Aspect 26: The method of aspect 25, further comprising: transmitting, via the downlink control message, an indication that reference signals associated with the first serving cell have been activated, wherein transmitting the reference signal is based at least in part on transmitting the indication that the reference signals have been activated.

Aspect 27: The method of any of aspects 23 through 26, wherein the indication to activate or deactivate the second serving cell is transmitted to the UE via a MAC-CE message.

Aspect 28: The method of any of aspects 23 through 27, further comprising: receiving, from the UE, a feedback message based at least in part on transmitting the indication to activate or deactivate the second serving cell, wherein the interruption period begins based at least in part on the feedback message.

Aspect 29: The method of any of aspects 23 through 28, wherein the indication comprises an activation of the second serving cell supported by the base station, the method further comprising: transmitting an additional reference signal to the UE via the second serving cell based at least in part on transmitting the indication to activate the second serving cell; and establishing wireless communications with the UE via the second serving cell based at least in part on transmitting the additional reference signal.

Aspect 30: The method of aspect 29, wherein the reference signal, the additional reference signal, or both, comprise a temporary reference signal.

Aspect 31: The method of aspect 30, wherein the temporary reference signal is a tracking reference signal or a non-zero power channel state information reference signal configured as the tracking reference signal.

Aspect 32: The method of any of aspects 29 through 31, wherein the reference signal transmitted via the first serving cell and the additional reference signal transmitted via the second serving cell are transmitted using a common set of time resources.

Aspect 33: The method of any of aspects 29 through 31, wherein the reference signal transmitted via the first serving cell and the additional reference signal transmitted via the second serving cell are transmitted using a common sub-carrier spacing.

Aspect 34: The method of any of aspects 29 through 33, further comprising: transmitting, to the UE, an indication that reference signals associated with both the first serving cell and the second serving cell have been activated, wherein transmitting the reference signal via the first serving cell, transmitting the additional reference signal via the second serving cell, or both, is based at least in part on transmitting the indication that the reference signals have been activated.

Aspect 35: The method of any of aspects 23 through 34, wherein the indication comprises a deactivation of the second serving cell supported by the base station, the method further comprising: receiving, from the UE, a feedback message based at least in part on transmitting the indication to deactivate the second serving cell; and determining that the second serving cell has been deactivated based at least in part on receiving the feedback message.

Aspect 36: The method of any of aspects 23 through 35, wherein the first serving cell comprises a primary cell, and the second serving cell comprises a secondary cell.

Aspect 37: The method of any of aspects 23 through 35, wherein both the first serving cell and the second serving cell each comprise secondary cells.

Aspect 38: The method of any of aspects 23 through 37, wherein the first serving cell and the second serving cell are in the same frequency band.

Aspect 39: The method of any of aspects 23 through 38, wherein the reference signal comprises an indication of automatic gain control associated with the first serving cell, an indication of tracking associated with the first serving cell, or both.

Aspect 40: The method of any of aspects 23 through 39, wherein the first serving cell is associated with a first radio access technology, and the second serving cell is associated with a second radio access technology different from the first radio access technology.

Aspect 41: The method of aspect 40, wherein each of the first radio access technology and the second radio access technology comprise one of a New Radio (NR) access technology, a Fifth Generation (5G) radio access technology, a Long-Term Evolution (LTE) radio access technology, or a Fourth Generation (4G) radio access technology.

Aspect 42: The method of any of aspects 23 through 41, wherein the first serving cell is associated with a first frequency band of a first radio access technology, and the second serving cell is associated with a second frequency band of the first radio access technology.

Aspect 43: The method of any of aspects 23 through 42, wherein the first serving cell is a primary-secondary cell of a secondary cell group, and the second serving cell is a secondary cell of the secondary cell group.

Aspect 44: An apparatus for wireless communication at a UE, comprising a processor; memory coupled with the processor; and instructions stored in the memory and executable by the processor to cause the apparatus to perform a method of any of aspects 1 through 22.

Aspect 45: An apparatus for wireless communication at a UE, comprising at least one means for performing a method of any of aspects 1 through 22.

Aspect 46: A non-transitory computer-readable medium storing code for wireless communication at a UE, the code comprising instructions executable by a processor to perform a method of any of aspects 1 through 22.

Aspect 47: An apparatus for wireless communication at a base station, comprising a processor; memory coupled with the processor; and instructions stored in the memory and executable by the processor to cause the apparatus to perform a method of any of aspects 23 through 43.

Aspect 48: An apparatus for wireless communication at a base station, comprising at least one means for performing a method of any of aspects 23 through 43.

Aspect 49: A non-transitory computer-readable medium storing code for wireless communication at a base station, the code comprising instructions executable by a processor to perform a method of any of aspects 23 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:

one or more processors, one or more memories coupled with the one or more processors; and instructions stored in the one or more memories and executable by the one or more processors to cause the apparatus to:

receive, from a network device via a medium access control element (MAC-CE) message and while the UE is in wireless communications with a first serving cell supported by the network device, an indication to activate or deactivate a second serving cell supported by the network device;

transmit a feedback message to the network device based at least in part on receipt of the indication to activate or deactivate the second serving cell;

receive a first reference signal from the network device via the second serving cell, the first reference signal received a first duration of time after receipt of the indication, wherein the first reference signal is a tracking reference signal, and wherein the first reference signal is triggered by the indication to activate or deactivate the second serving cell, and wherein a beginning of the first duration of time is based at least in part on transmission of the feedback message; and activate the second serving cell.

2. The apparatus of claim 1, wherein the indication comprises an activation of the second serving cell supported by the network device, the instructions are further executable by the one or more processors to cause the apparatus to:

receive the first reference signal from the network device via the second serving cell based at least in part on receiving the indication to activate the second serving cell; and establish wireless communications with the network device via the second serving cell based at least in part on receiving the first reference signal.

3. The apparatus of claim 1, wherein the instructions are further executable by the one or more processors to cause the apparatus to:

receive a prior reference signal from the network device via the first serving cell, the prior reference signal received a second duration of time after receipt of the indication and before reception of the first reference signal, wherein the first duration of time is an interruption period for the wireless communications with the first serving cell.

4. The apparatus of claim 3, wherein the prior reference signal received via the first serving cell and the first reference signal received via the second serving cell are received using a common set of time resources.

5. The apparatus of claim 3, wherein the prior reference signal received via the first serving cell and the first reference signal received via the second serving cell are received using a common sub-carrier spacing.

6. The apparatus of claim 3, wherein the prior reference signal received via the first serving cell and the first reference signal received via the second serving cell are received using different sub-carrier spacings.

7. The apparatus of claim 3, wherein the instructions are further executable by the one or more processors to cause the apparatus to:

receive, from the network device, control information that indicates that reference signals associated with both the first serving cell and the second serving cell have been activated, wherein receiving the prior reference signal via the first serving cell, receiving the first reference signal via the second serving cell, or both, is based at least in part on receiving the control information that the reference signals have been activated.

8. The apparatus of claim 1, wherein the instructions are further executable by the one or more processors to cause the apparatus to:

receiving, from the network device via the first serving cell, a downlink control message scheduling a downlink transmission from the network device to the UE, wherein receiving the indication to activate or deactivate the second serving cell is based at least in part on the downlink control message.

9. The apparatus of claim 8, wherein the downlink control message further comprises an indication of a set of resource usable by the UE for receiving the first reference signal.

10. The apparatus of claim 1, wherein the instructions are further executable by the one or more processors to cause the apparatus to:

adjust an automatic gain control (AGC) associated with the second serving cell, a time or frequency tracking associated with the second serving cell, or both, based at least in part on the first reference signal.

11. The apparatus of claim 10, wherein the instructions are further executable by the one or more processors to cause the apparatus to:

establish a connection with the second serving cell, determining that the second serving cell has been activated, or both, based at least in part on the AGC, the time or frequency tracking, or both.

12. The apparatus of claim 1, wherein the first serving cell comprises a primary cell, and wherein the second serving cell comprises a secondary cell.

13. The apparatus of claim 1, wherein both the first serving cell and the second serving cell are each secondary cells.

14. The apparatus of claim 1, wherein the first serving cell and the second serving cell are in a same frequency band.

15. The apparatus of claim 1, wherein the first serving cell is associated with a first radio access technology, and the second serving cell is associated with a second radio access technology different from the first radio access technology.

16. The apparatus of claim 1, wherein the first serving cell is associated with a first frequency band of a first radio access technology, and the second serving cell is associated with a second frequency band of the first radio access technology.

17. The apparatus of claim 1, wherein the first serving cell is a primary-secondary cell of a secondary cell group, and wherein the second serving cell is a secondary cell of the secondary cell group.

18. A method for wireless communication at a user equipment (UE), comprising:

receiving, from a network device via a medium access control element (MAC-CE) message and while the UE is in wireless communications with a first serving cell supported by the network device, an indication to activate or deactivate a second serving cell supported by the network device;

transmitting a feedback message to the network device based at least in part on receipt of the indication to activate or deactivate the second serving cell;

receiving a first reference signal from the network device via the second serving cell, the first reference signal received a first duration of time after receipt of the indication, wherein the first reference signal is a tracking reference signal, and wherein the first reference signal is triggered by the indication to activate or deactivate the second serving cell, and wherein a beginning of the first duration of time is based at least in part on transmission of the feedback message; and activating the second serving cell.

19. The method of claim 18, wherein the indication comprises an activation of the second serving cell supported by the network device, the method further comprising:

receiving the first reference signal from the network device via the second serving cell based at least in part on receiving the indication to activate the second serving cell; and establishing wireless communications with the network device via the second serving cell based at least in part on receiving the first reference signal.

20. The method of claim 18, further comprising:

receiving a prior reference signal from the network device via the first serving cell, the prior reference signal received a second duration of time after receipt of the indication and before reception of the first reference signal, wherein the first duration of time is an interruption period for the wireless communications with the first serving cell.

21. The method of claim 20, wherein the prior reference signal received via the first serving cell and the first reference signal received via the second serving cell are received using a common set of time resources.

22. The method of claim 20, wherein the prior reference signal received via the first serving cell and the first reference signal received via the second serving cell are received using a common sub-carrier spacing.

23. The method of claim 20, wherein the prior reference signal received via the first serving cell and the first reference signal received via the second serving cell are received using different sub-carrier spacings.

24. The method of claim 20, further comprising:

receiving, from the network device, control information that indicates that reference signals associated with both the first serving cell and the second serving cell have been activated, wherein receiving the prior reference signal via the first serving cell, receiving the first reference signal via the second serving cell, or both, is based at least in part on receiving the control information that the reference signals have been activated.

25. The method of claim 18, further comprising:

receiving, from the network device via the first serving cell, a downlink control message scheduling a downlink transmission from the network device to the UE, wherein receiving the indication to activate or deactivate the second serving cell is based at least in part on the downlink control message.

26. The method of claim 25, wherein the downlink control message further comprises an indication of a set of resource usable by the UE for receiving the first reference signal.

27. An apparatus for wireless communication at a user equipment (UE), comprising:

means for receiving, from a network device via a medium access control element (MAC-CE) message and while the UE is in wireless communications with a first serving cell supported by the network device, an indication to activate or deactivate a second serving cell supported by the network device;

means for transmitting a feedback message to the network device based at least in part on receipt of the indication to activate or deactivate the second serving cell;

means for receiving a first reference signal from the network device via the second serving cell, the first reference signal received a first duration of time after receipt of the indication, wherein the first reference signal is a tracking reference signal, and wherein the first reference signal is triggered by the indication to activate or deactivate the second serving cell, and wherein a beginning of the first duration of time is based at least in part on transmission of the feedback message; and means for activating the second serving cell.

28. A non-transitory computer-readable medium storing code for wireless communication at a user equipment (UE), the code comprising instructions executable by a processor to:

receive, from a network device via a medium access control element (MAC-CE) message and while the UE is in wireless communications with a first serving cell supported by the network device, an indication to activate or deactivate a second serving cell supported by the network device;

transmit a feedback message to the network device based at least in part on receipt of the indication to activate or deactivate the second serving cell;

receive a first reference signal from the network device via the second serving cell, the first reference signal received a first duration of time after receipt of the indication, wherein the first reference signal is a tracking reference signal, and wherein the first reference signal is triggered by the indication to activate or deactivate the second serving cell, and wherein a beginning of the first duration of time is based at least in part on transmission of the feedback message; and activate the second serving cell.

* * * * *